United States Patent [19]
Ferrenberg

[11] Patent Number: 5,632,255
[45] Date of Patent: May 27, 1997

[54] REGENERATED ENGINE WITH AN IMPROVED HEATING STROKE

[76] Inventor: Allan J. Ferrenberg, Rt. 2, Box 394, Swall Meadows, Bishop, Calif. 93514

[21] Appl. No.: 250,168

[22] Filed: May 27, 1994

[51] Int. Cl.$^6$ ........................................... F02G 5/00
[52] U.S. Cl. ........................................ 123/543; 60/517
[58] Field of Search ........................ 123/543, 546, 123/552, 550, 78 A, 193.3, 193.5; 60/515, 517, 526, 616, 619, 620, 690, 712

[56] References Cited

U.S. PATENT DOCUMENTS

| | | | |
|---|---|---|---|
| 2,596,051 | 5/1952 | Stigter | 60/526 |
| 3,777,718 | 12/1973 | Pattas | 60/526 |
| 4,133,172 | 1/1979 | Cataldo | 60/39.63 |
| 4,280,468 | 7/1981 | Millman | 123/546 |
| 4,715,326 | 12/1987 | Thring | 123/543 |
| 4,781,155 | 11/1988 | Brucker | 123/70 V |
| 4,790,284 | 12/1988 | Ferrenberg et al. | 123/543 |
| 4,928,658 | 5/1990 | Ferrenberg et al. | 123/543 |

*Primary Examiner*—Marguerite Macy

[57] ABSTRACT

An improved, reciprocating internal combustion engine is disclosed herein. This engine consists of multiple cylinders, each closed by a cylinder head and containing a piston which is connected to a power output shaft. Each cylinder has means for the intake and exhaust of working fluid. It also contains a movable, thermal regenerator, an alternating flow heat exchanger, and means to move this regenerator. Finally, means are provided for the introduction of fuel into the cylinder. The regenerated, internal combustion, reciprocating engine and several variations on it disclosed herein are substantially different from prior art and provide critical improvements over that prior art. These improvements include different operating processes—especially an improved heating stroke, the use of unequal effective compression and expansion ratios, non direct fuel injection, and others.

29 Claims, 20 Drawing Sheets

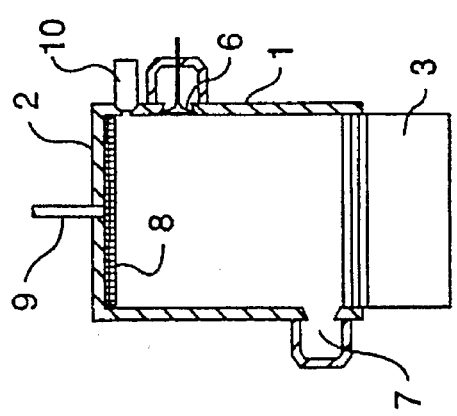
Fig-4a-
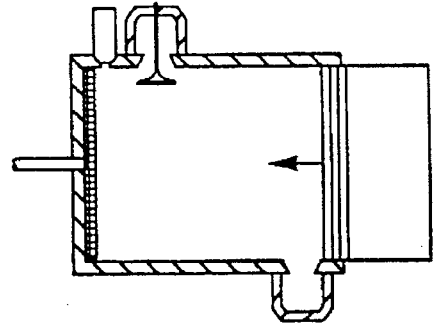
Fig-4b-
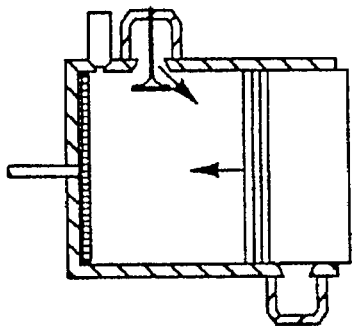
Fig-4c-
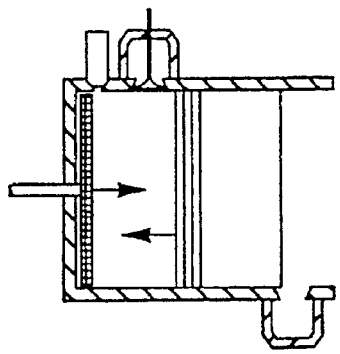
Fig-4d-
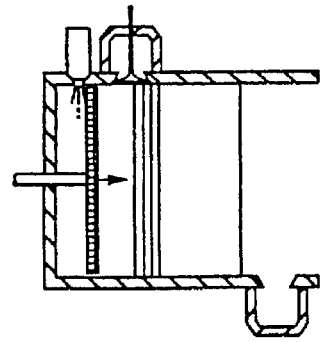
Fig-4e-
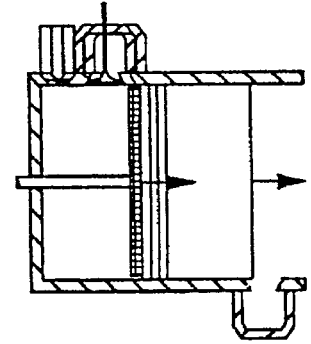
Fig-4f-
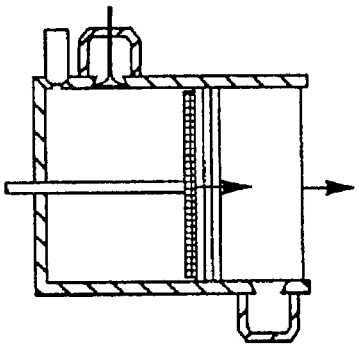
Fig-4g-
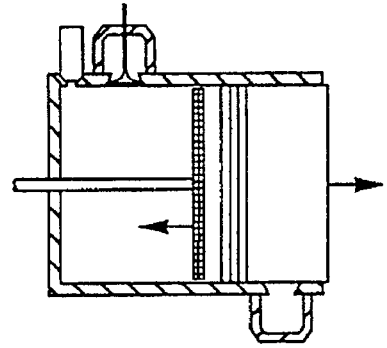
Fig-4h-

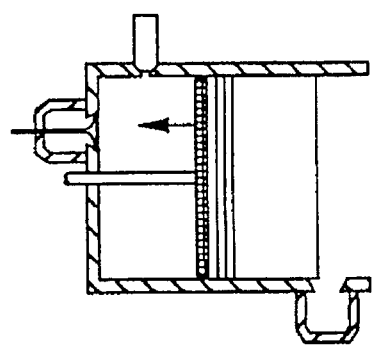
Fig-5d-
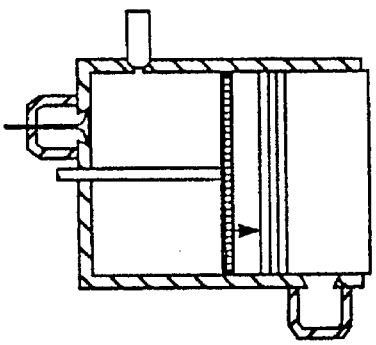
Fig-5h-
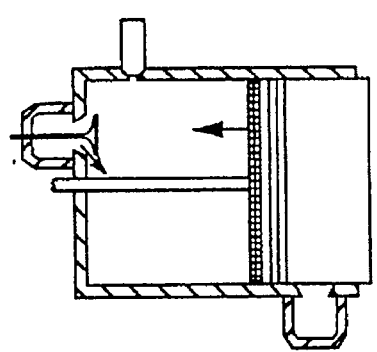
Fig-5c-
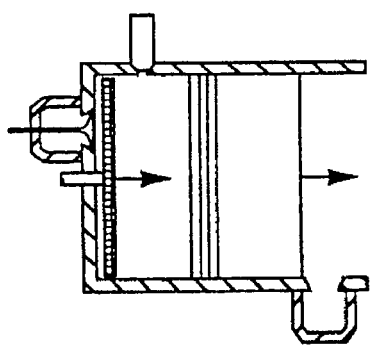
Fig-5g-
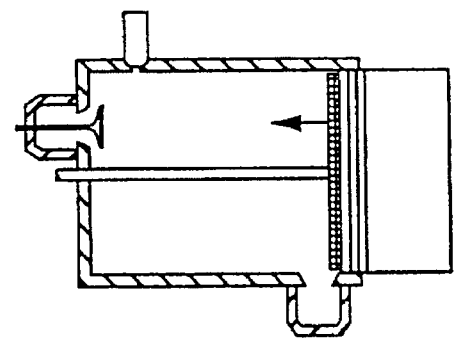
Fig-5b-
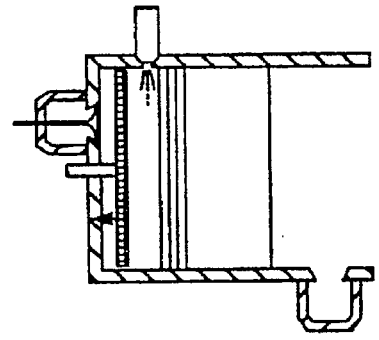
Fig-5f-
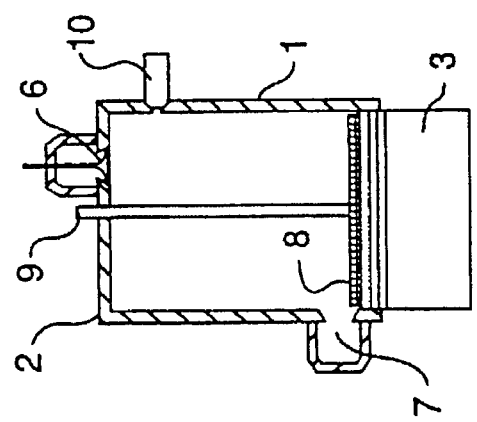
Fig-5a-
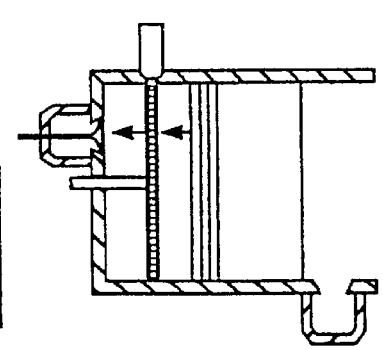
Fig-5e-

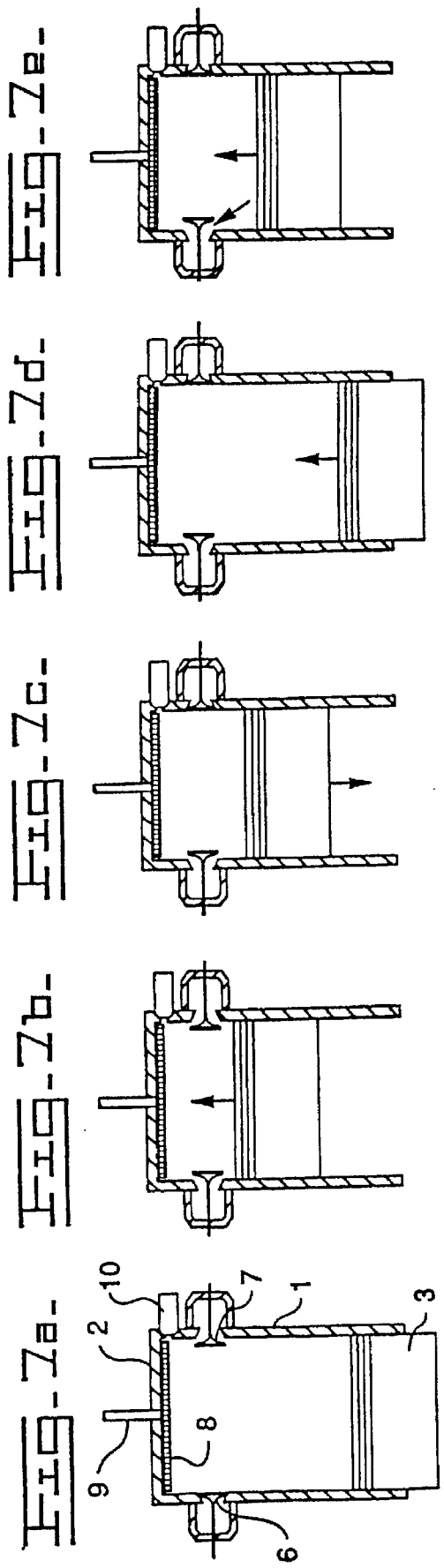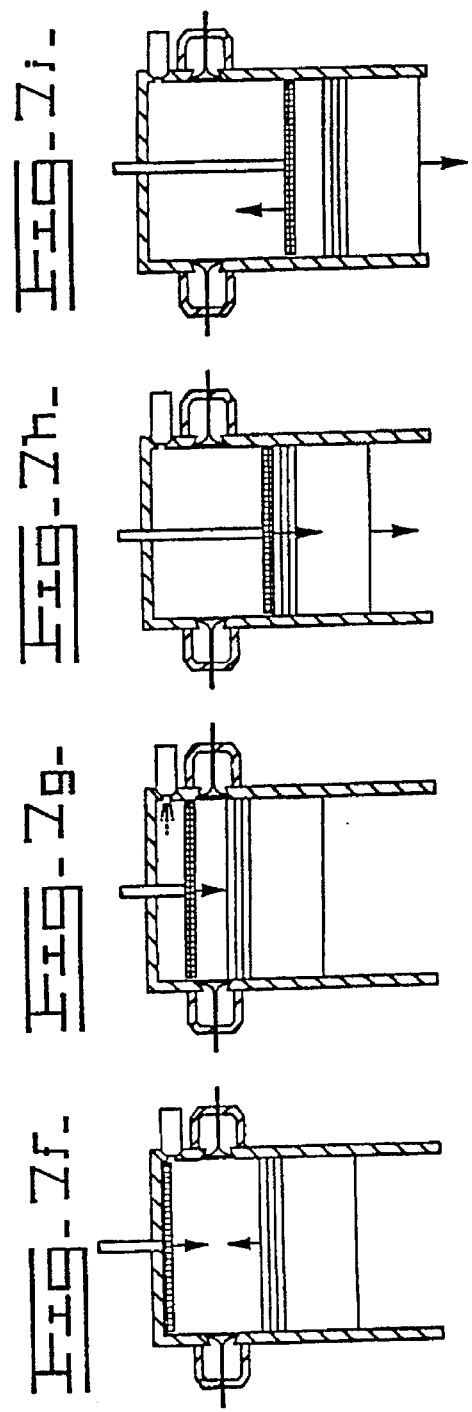

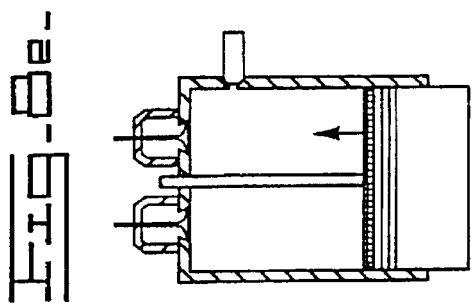
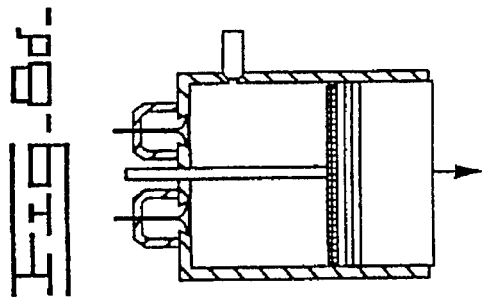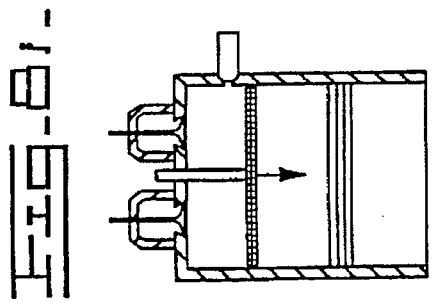
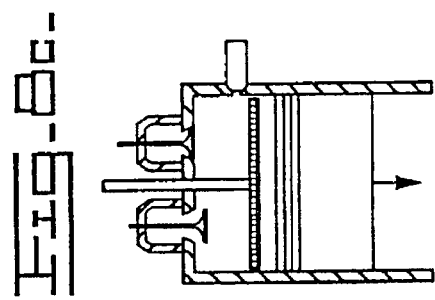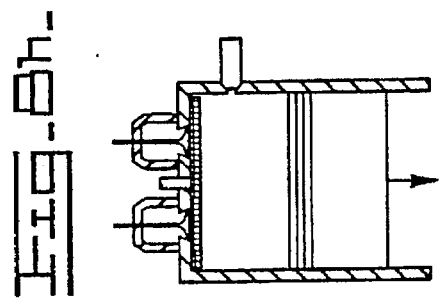
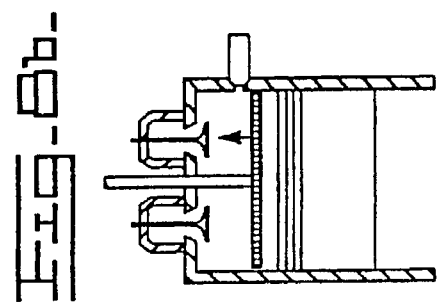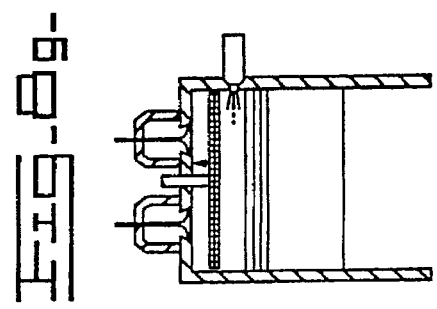
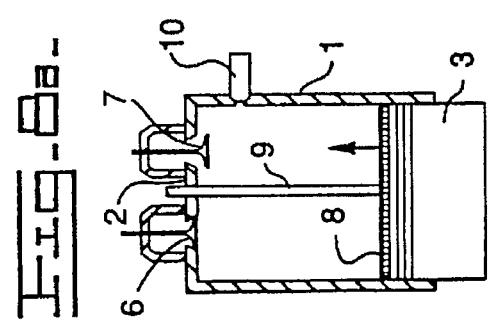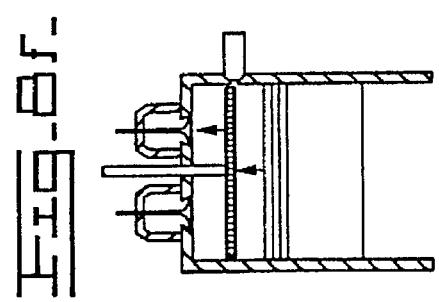

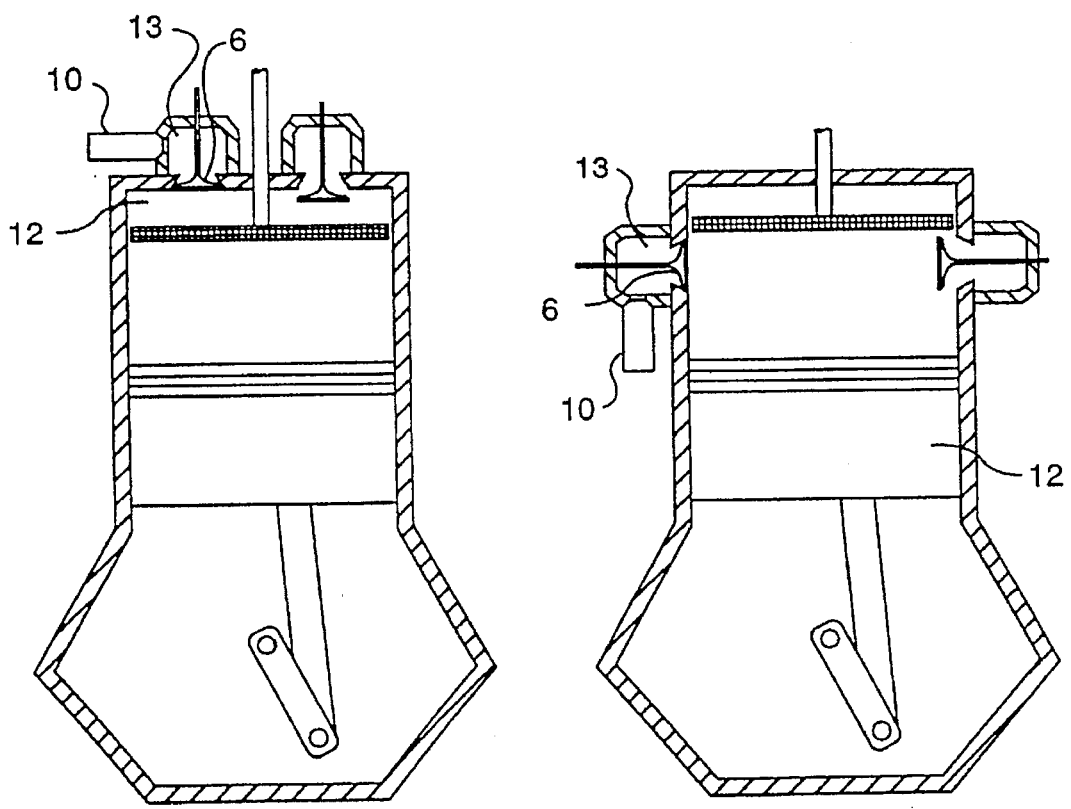

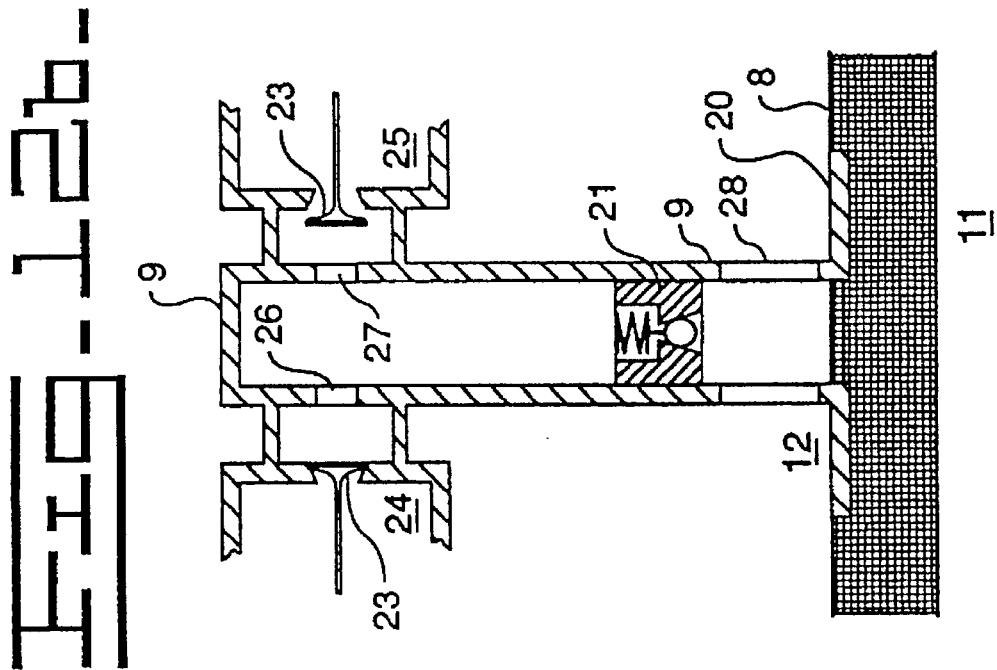
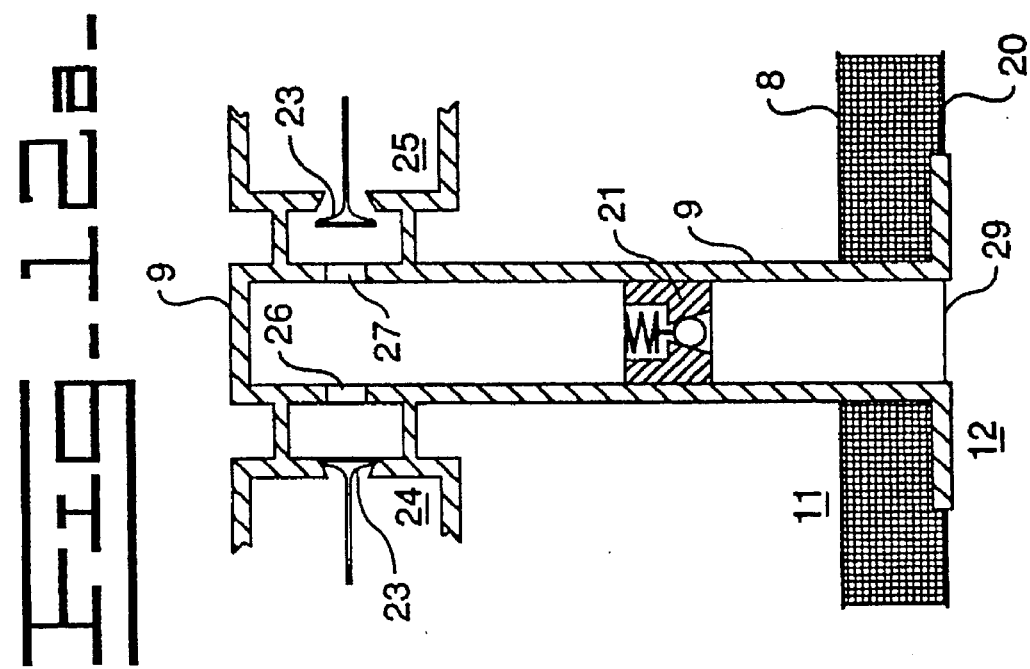

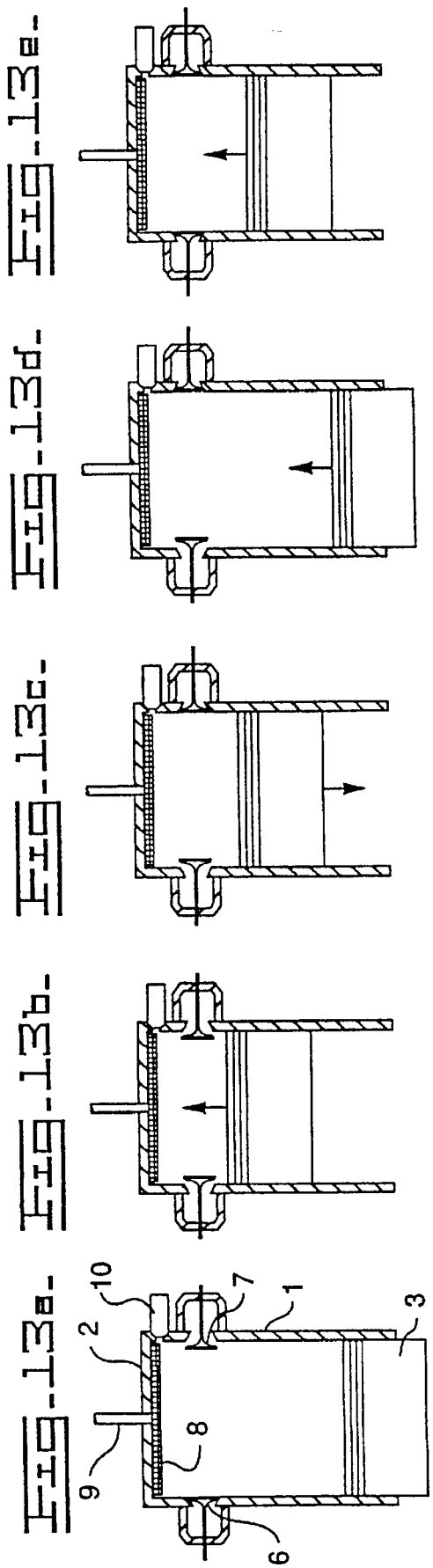

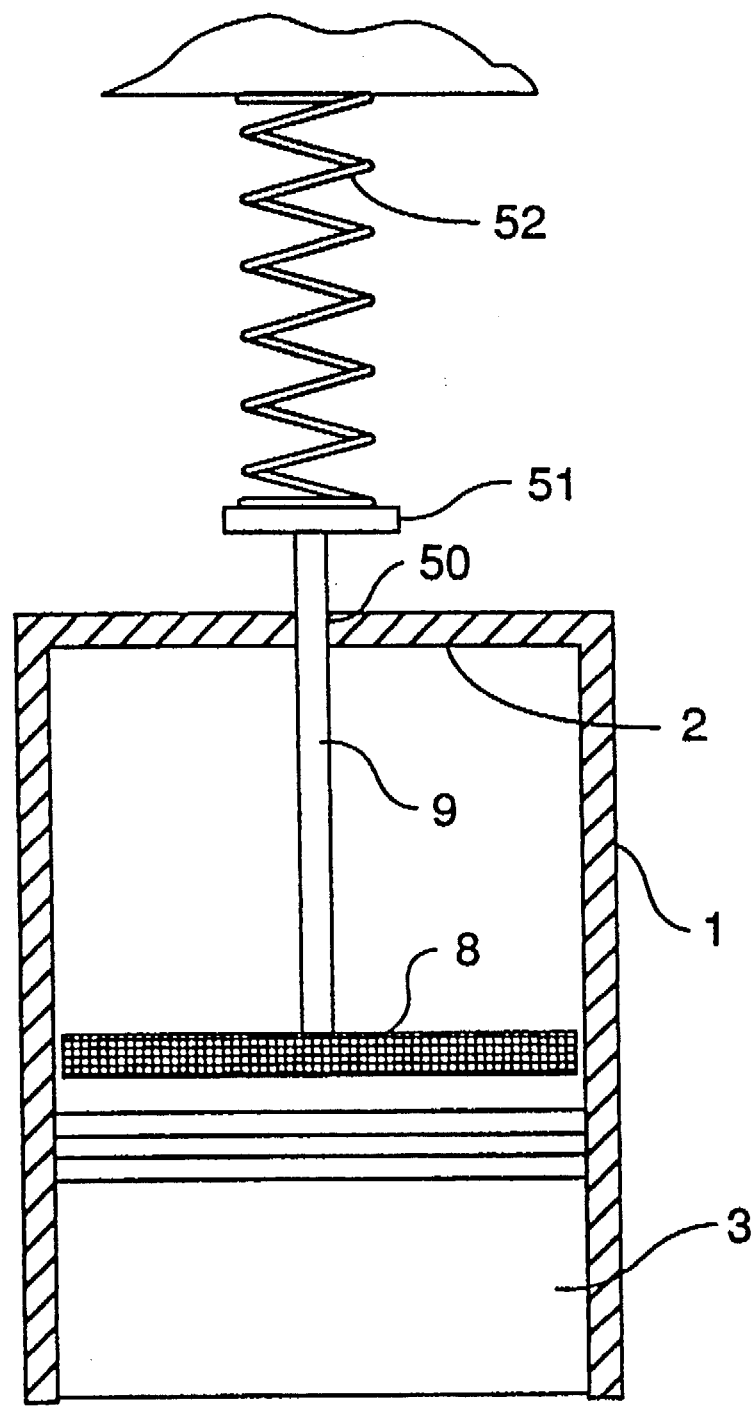
Fig_19_

REGENERATED ENGINE WITH AN IMPROVED HEATING STROKE

BACKGROUND OF THE INVENTION

1. Field of the Invention

This invention relates to thermally regenerated, reciprocating, internal combustion engines that employ a movable regenerator.

2. Description of the Related Art

Thermal regeneration is the capturing of waste heat from a thermodynamic cycle (or a heat engine operating on some thermodynamic cycle), and the utilization of that energy within the cycle or engine to improve the cycle or engine's performance. This is commonly done with many heat engines, including Stirling engines, gas turbines, and Rankine cycle devices. In a gas turbine, consisting of a compressor, combustor, and turbine, the temperature of the air leaving the turbine is often greater than the temperature of the air leaving the compressor. If the energy in the turbines exhaust can be transferred to the air leaving the compressor, it will not be necessary to add as much heat (fuel) in the combustor to raise the air temperature to the desired turbine inlet temperature. This means that the same work is accomplished, but less fuel is employed. Therefore, the specific fuel consumption of such a thermally regenerated gas turbine is improved. Thermal regeneration of gas turbines is commonly accomplished by the use of a heat exchanger that transfers energy from the exhaust gases to the compressed air.

Gasoline and diesel engine operation is generally approximated by a thermodynamic cycle referred to as the Otto cycle. In principle, an Otto cycle can also be thermally regenerated. This would be done by transferring heat from the gases at the conclusion of the expansion stroke to the gases of the next cycle at the conclusion of the compression stroke. The benefits that can be thus attained are substantial. Fuel consumption is reduced in a manner similar to that of the regenerated gas turbine. In addition, a regenerated Otto cycle is thermodynamically capable of providing higher gas temperatures during the cycle, which results in even greater improvements in efficiency and power. Since reciprocating engines only experience these higher temperatures for brief times, they can withstand these higher temperatures to some extent. Thus the benefits of regeneration are even greater for an Otto cycle device than they are for the temperature limited gas turbine.

The advantages of thermally regenerated gasoline or diesel engines are readily apparent and quite substantial. Unfortunately, viable and effective means by which this can be accomplished have not previously been developed. The difficulty lies in the fact that the compression, heating and expansion processes occur in the same location—i.e. within the cylinder. This makes it difficult to conceive of some means by which the heat can be captured and transferred to the compressed air at a different time in the cycle. For a gas turbine, which is a steady flow device with the cycle processes separated in space, it is relatively easy to add a heat exchanger at the appropriate place. It is much more difficult to do this in a non-steady flow, reciprocating engine where all the processes occur in the same location.

The approach taken by most inventors who attempted to incorporate regeneration into reciprocating internal combustion engines was to separate the engine processes in space. In this way it becomes relatively easy to insert a heat exchanger between the engine components that accomplish each process. This has led to a number of approaches such as those of Hirsch (1874, U.S. Pat. No. 155,087), Martinka (1937, U.S. Pat. No. 2,239,922), Pattas (1973, U.S. Pat. No. 3,777,718), Bland (1975, U.S. Pat. No. 3,871,179), Pfefferle (1975, U.S. Pat. No. 3,923,011), Cowans (1977, U.S. Pat. No. 4,004,421), Stockton (1978, U.S. Pat. No. 4,074,533), Webber (1986, U.S. Pat. No. 4,630,447), Ruiz (SAE paper 930063, 1993), and Carmichael (Chrjapin Master's thesis, MIT, 1975). All of these approaches involve at least two cylinders, generally one in which compression occurs and a second where the combustion and expansion occur. In the flow passage connecting these cylinders or in one of the cylinders there is a stationary permeable material that comprises the regenerator. The regenerator is an alternating flow heat exchanger. The expanded combustion gases are passed through the regenerator and transfer thermal energy to it. During the next cycle compressed air is forced through the regenerator and absorbs this energy. Thus heat is transferred from the hot exhaust gases to the compressed air—the essence of thermal regeneration.

Unfortunately, none of these earlier approaches for regeneration of internal combustion reciprocation engines have been successful. The reason for their failure lies in a basic feature of those approaches—the separation of the processes into different cylinders. Because some air and exhaust is always trapped in the transfer passages, because of "blowdown" losses between cylinders in some designs, and because not all of the air can be regeneratively heated or cooled, or be in the appropriate locations at the optimum times, the performance of these engines is reduced.

More recently, a new approach has been conceived. This new approach allows the processes to occur within a single cylinder. The most unique feature of this new approach is a movable regenerator. This regenerator is in the form of a thin disc with a diameter essentially equal to the engine bore. This regenerator disc is located between the cylinder head and the piston. This moving regenerator sweeps through all of the internal volume of the cylinder twice during each engine operating cycle. As it moves through the gas in the cylinder, it exchanges energy with that gas. One sweep removes energy from the expanded combustion products. The other sweep transfers this energy to the compressed working fluid near the conclusion of the next compression stroke. The regenerator movement that occurs near the end of the expansion stroke and cools the combustion products is referred to as the regenerative cooling stroke. The regenerator movement that starts near the end of the compression stroke and heats the compressed air is referred to as the regenerative heating stroke. Inventions based upon this approach of a movable regenerator are included in the patents of Ferrenberg (1988, U.S. Pat. No. 4,790,284 and 1990, U.S. Pat. No. 4,928,658) and Millman (1981, U.S. Pat. No. 4,280,468).

Regenerated engines employing movable regenerators that sweep through the interior volume of the cylinder can be divided into two classes: those in which the combustion occurs between the piston and the regenerator (hot piston designs) and those in which the combustion occurs between the regenerator and the cylinder head (cool or cold piston designs). The "hot volume" is always the volume where the combustion occurs and the "cold volume" lies on the other side of the regenerator. The side of the regenerator that faces the hot volume is referred to as the hot side of the regenerator and the side of the regenerator that faces the cold volume is the cold side of the regenerator.

In addition to other regenerated engine inventions unrelated to this patent application, Millman (U.S. Pat. No. 4,280,468) discloses and claims a hot piston regenerated engine operating on a four stroke cycle. This engine of Millman's lacks a regenerative cooling stroke. Instead, he maintains the regenerator stationary and adjacent to the valves in the cylinder head while the blowdown and the exhaust occur. This is a serious deficiency in the manner in which the energy is extracted from the working fluid by the regenerator that can substantially degrade engine performance. In addition, Millman does not consider the use of different compression to expansion ratios, cool piston regenerated engines, two stroke regenerated engines, and regenerated engines incorporating many of the other features and innovations disclosed in this patent application.

The previous disclosures of Ferrenberg (U.S. Pat. Nos. 4,790,284 and 4,928,658) cover both two and four stroke, and hot and cool piston regenerated engines. However, these earlier inventions have some basic deficiencies that are corrected by the substantially different operation of the regenerated engine disclosed herein. In addition, these earlier engines do not include the use of, or means for, differing compression and expansion ratios, the introduction of fuel by means other than direct injection into the combustion region, throttling as a means to reduce power and maintain high efficiency, the use of flush mounted valves in cool piston engines, the use of regenerators made from ceramic foam materials, pneumatic regenerator lifters, and other features and innovations disclosed herein. In addition, these earlier patents of Ferrenberg maintain the regenerator stationary during the blowdown or fail to substantially complete the regenerative cooling stroke prior to the blowdown. This is similar to the deficiency of Millman's engine. Also, the earlier disclosures and claims of Ferrenberg specifically close the exhaust valve prior to the opening of the intake valve in all regenerated engines employing valves. It is highly advantageous to have both valves open at the same time, for a short period.

Other substantial differences exist between the earlier inventions of Millman and Ferrenberg, and the regenerated engine disclosed herein. All of these are discussed in greater detail in the section entitled "Detailed Description of the Invention".

SUMMARY OF THE INVENTION

This invention is an internal combustion, reciprocating, regenerated engine made up of a number of similar working units, often referred to as cylinders. Each working unit is comprised of a cylinder that is closed at one end by a cylinder head and contains a movable piston that is connected to a power output shaft. Means are provided to permit and control the flow of working fluid into and out of the cylinder. An alternating flow heat exchanger, called a regenerator, is located within the cylinder, between the piston and the cylinder head. This regenerator can move between the piston and the cylinder head, and means are provided to accomplish this movement at the appropriate times during the engine's operating cycle. This movement of the regenerator is such that the regenerative heating stroke begins during the last quarter of the piston's compression stroke and ends during the first quarter of the piston's expansion stroke. This movement is of such speed and timing so as to maintain, to the greatest extent possible, a flow of working fluid through the regenerator, from the regenerator's cold side to its hot side, throughout the regenerator's motion. Finally, means are provided for the introduction of fuel into the cylinder during this regenerative heating stroke.

One embodiment of this invention controls the intake means opening and closing times so that the degree of compression which the working fluid experiences in the cylinder is less than the degree of expansion. Other embodiments provide fuel introduction means that provide for fuel introduction (1) on the cold side of the regenerator and (2) with the incoming fresh working fluid. Additional embodiments include intake and exhaust means that include the flow of a portion of the working fluid through a tube or other means used to move the regenerator. Another embodiment provides means for reducing the amount of working fluid that enters the cylinder. Additional embodiments that are applicable to cool piston regenerated engines provide intake and exhaust means that are located in the cylinder wall and are substantially flush mounted in that cylinder wall when closed. One further embodiment that is only applicable to regenerated engines with valves provides for valves that are so operable that both the intake and the exhaust valves may be open at the same time during the operating cycle.

Additional embodiments of this invention provide for catalytic materials on the regenerator's surfaces that (1) increase the reactivity of the fresh working fluid passing through it or (2) reduce pollutants in the spent working fluid passing through it.

Another embodiment of this invention provides a regenerator having internal flow passages that are of different average size in different portions of the regenerator.

An additional embodiment of this invention employs a secondary piston connected to the regenerator which is acted upon by the pressure in the cylinder so as to provide a portion of the force required to place the regenerator at the appropriate locations at the appropriate times in the operating cycle.

A final embodiment of this invention provides means for moving the regenerator that include means for providing variations in the cyclic motion of the regenerator as a function of the engine's speed and load.

OBJECTS OF THE INVENTION

The primary object of this invention is to provide a highly efficient, regenerated, internal combustion engine.

Another object of this invention is to provide an engine with very high brake mean effective pressure.

Another object of this invention is to provide a regenerator that can survive and function in the engine environment.

Another object of this invention is to exploit the high payoff to be obtained from regenerating an Otto or diesel cycle engine.

Other objects, advantages, and novel features will become apparent from the following detailed description of the invention when considered in conjunction with the accompanying drawings.

BRIEF DESCRIPTION OF THE DRAWINGS

FIG. 4, a–h, depicts the operating sequence of a cool piston regenerated engine operating on a two stroke cycle and having working fluid entering the cylinder during the compression stroke.

FIG. 5, a–h, depicts the operating sequence of a hot piston regenerated engine operating on a two stroke cycle and having fresh working fluid entering the cylinder during the compression stroke.

FIG. 7, a–i, depicts the operating sequence of a cool piston regenerated engine operating on a four stroke cycle and having a late closing intake valve.

FIG. 8, a–i, depicts the operating sequence of a hot piston regenerated engine operating on a four stroke cycle and having an early closing intake valve.

FIG. 11, a and b, presents possible placements for the fuel injector for both a hot piston regenerated engine and a cool piston regenerated engine when intake manifold fuel injection is employed.

FIG. 12, a and b, presents two possible ways to utilize the regenerator drive rod as a means for intake and exhaust of working fluid.

FIG. 13, a–i, depicts the operating sequence of a cool piston regenerated engine operating on a four stroke cycle.

FIG. 19 presents a pneumatic lifter in a hot piston engine.

The same elements throughout the figures are designated by the same reference characters.

DETAILED DESCRIPTION OF THE INVENTION

Figure 1:
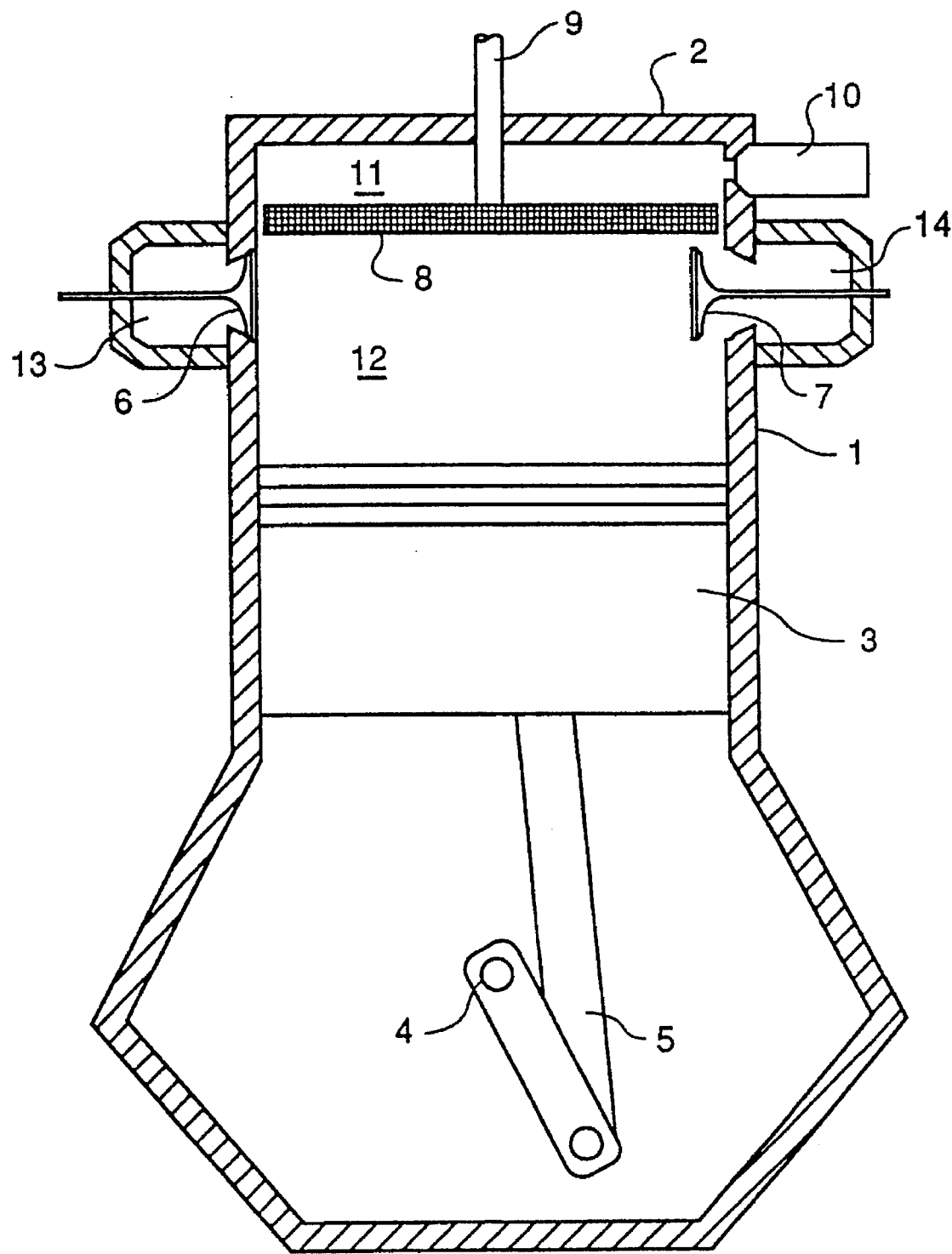
FIG. 1 is a schematic illustration of one embodiment of a cool piston regenerated engine.

This invention is a regenerated, reciprocating, internal combustion engine employing a movable regenerator as described herein. All of these embodiments of this invention employ either a two stroke cycle comprising a compression stroke and an expansion stroke, or a four stroke cycle comprising intake, compression, expansion, and exhaust strokes. Each stroke is accomplished by moving the piston from its uppermost or top dead center (TDC) position, closest to the cylinder head, to its lowermost or bottom dead center (BDC) position, furthest from the cylinder head, or in the reverse direction.

Each of these embodiments of this invention also has two regenerator strokes, a regenerative heating stroke and a regenerative cooling stroke. During the regenerative heating stroke the regenerator is moved through the working fluid trapped between the piston and the cylinder head and transfers heat to this working fluid. For a cool piston regenerated engine, the regenerative heating stroke starts with the regenerator adjacent to the cylinder head and ends with the regenerator adjacent to and moving with the piston. For a hot piston regenerated engine the regenerative heating stroke starts with the regenerator adjacent to and moving with the piston and ends with the regenerator adjacent to the cylinder head.

During the regenerative cooling stroke the regenerator moves in the opposite direction (as compared to the heating stoke) through the working fluid trapped between the piston and the cylinder head and absorbs heat from this working fluid. For a cool piston regenerated engine, the regenerative cooling stroke begins with the regenerator adjacent to and moving with the piston and ends with the regenerator adjacent to the cylinder head. For a hot piston regenerated engine the regenerative cooling stroke begins with the regenerator adjacent to the cylinder head and ends with the regenerator adjacent to the piston.

Between the times of these motions the regenerator is either adjacent to, and moving with, the piston or, it is adjacent to the cylinder head. "Adjacent to" means that the regenerator is in contact with the piston or cylinder head or as close as possible to these components given the mechanical and structural constraints associated with the coming together of rapidly moving objects. "Close to" is synonymous with "adjacent to". While it is advantageous to minimize any internal volumes that are not swept by the regenerator, it must be recognized that small clearance regions or volumes will probably be necessary to prevent damaging impacts between components and for clearances between moving components. Examples of such clearance regions or volumes include small gaps between the regenerator and the cylinder head or the piston when the regenerator is adjacent to these components, and the clearance gap between the periphery of the regenerator and the cylinder wall.

The region where combustion occurs is the hot volume or hot space and the volume on the other side of the regenerator is referred to as the cold volume or cold space. The sizes of both of these volumes change during the operating cycle as the piston and regenerator move. At some times during the cycle each of these volumes becomes very small or zero. The side of the regenerator that is adjacent to the hot volume will be the hottest part of the regenerator and is referred to as the hot side of the regenerator. The opposite side is the cold side.

The working fluid that is expected to be employed in this invention is air. However, this working fluid could be any mixture of gases, liquids, and solids that can undergo an exothermic chemical reaction with the fuel. The working fluid that is introduced into the cylinder through the intake manifold is sometimes referred to as fresh working fluid. This fresh working fluid can contain some residual reaction products that are trapped in the cylinder after the exhaust means close or that are added to it in the intake manifold (i.e. exhaust gas recirculation). After the combustion (or other exothermic reaction which provides the power for the engine) the working fluid is referred to as spent working fluid or exhaust fluid. The fuel may be any solid, liquid, gas, or combinations of these that can undergo an exothermic reaction with the fresh working fluid.

FIG. 1 presents an embodiment of a cool piston, regenerated engine that can be operated in either a two or four stroke manner. The cylinder (1) is closed at one end by a cylinder head (2) and contains a piston (3) which is connected to a power output shaft (4) by an appropriate mechanism (5) for converting the linear motion of the piston to the rotating motion of the shaft. This mechanism (5) can comprise the piston rod and eccentric as shown in FIG. 1.

Means for the inflow and outflow of working fluid are provided by the intake valve (6) and the exhaust valve (7), which are shown as conventional poppet valves here. When open, these valves connect the intake manifold (13) and the exhaust manifold (14) to the cylinder volume located between the piston and the regenerator (8). Only the portion of these manifolds that are adjacent to the cylinder are shown in the Figures. The valves can be flush with the cylinder wall when closed, as is shown in FIG. 1, or they can be located some short distance from the cylinder and be connected to the cylinder via ports or passages. Flush mounted valves are preferred. The intake and exhaust means can also be simple openings (often called ports) that are located in the cylinder wall and are opened and closed by being covered and uncovered by the piston, as is commonly done in small two stroke engines. However these intake and exhaust means are configured and placed, they must communicate with the cold volume (12). "Communicate with" as used herein means that the intake and exhaust means must connect with the cold volume so as to allow flow into or out of the cold volume either directly or through one or more flow passages. For a cool piston engine such as this, the cold volume is always located between the regenerator and the piston. Thus these intake and exhaust means must provide flow passages through the cylinder wall, the piston, the regenerator, or combinations of these.

Inside the cylinder lies a porous disc of material referred to as the regenerator (8). This regenerator has a diameter slightly less than the cylinder bore. It is moved by a regenerator drive rod (9) back and forth between the piston and the cylinder head, parallel to the axis of the cylinder. The drive rod may pass through the cylinder head as shown in FIG. 1, or it may pass through the piston. In all regenerated engines, this drive rod need not be of circular cross section, nor need it be solid (i.e. it can be a tube). Other means to move the regenerator, such as an annular sleeve between the piston and the cylinder wall, can also be applied to move the regenerator. No sealing means between the regenerator periphery and the cylinder wall are shown in FIG. 1. However, the use of seals, such as labyrinth seals may be advantageously applied to prevent or minimize the flow of working fluid around the periphery of the regenerator.

Fuel is injected into the hot volume by means of a fuel injector (10), such as those that are commonly employed in direct injection diesel engines. For a cool piston engine, the hot volume always lies between the cylinder head and the regenerator. By injecting directly into this region at a time when the working fluid in this region is very hot, the fuel will be spontaneously ignited.

Figure 2:
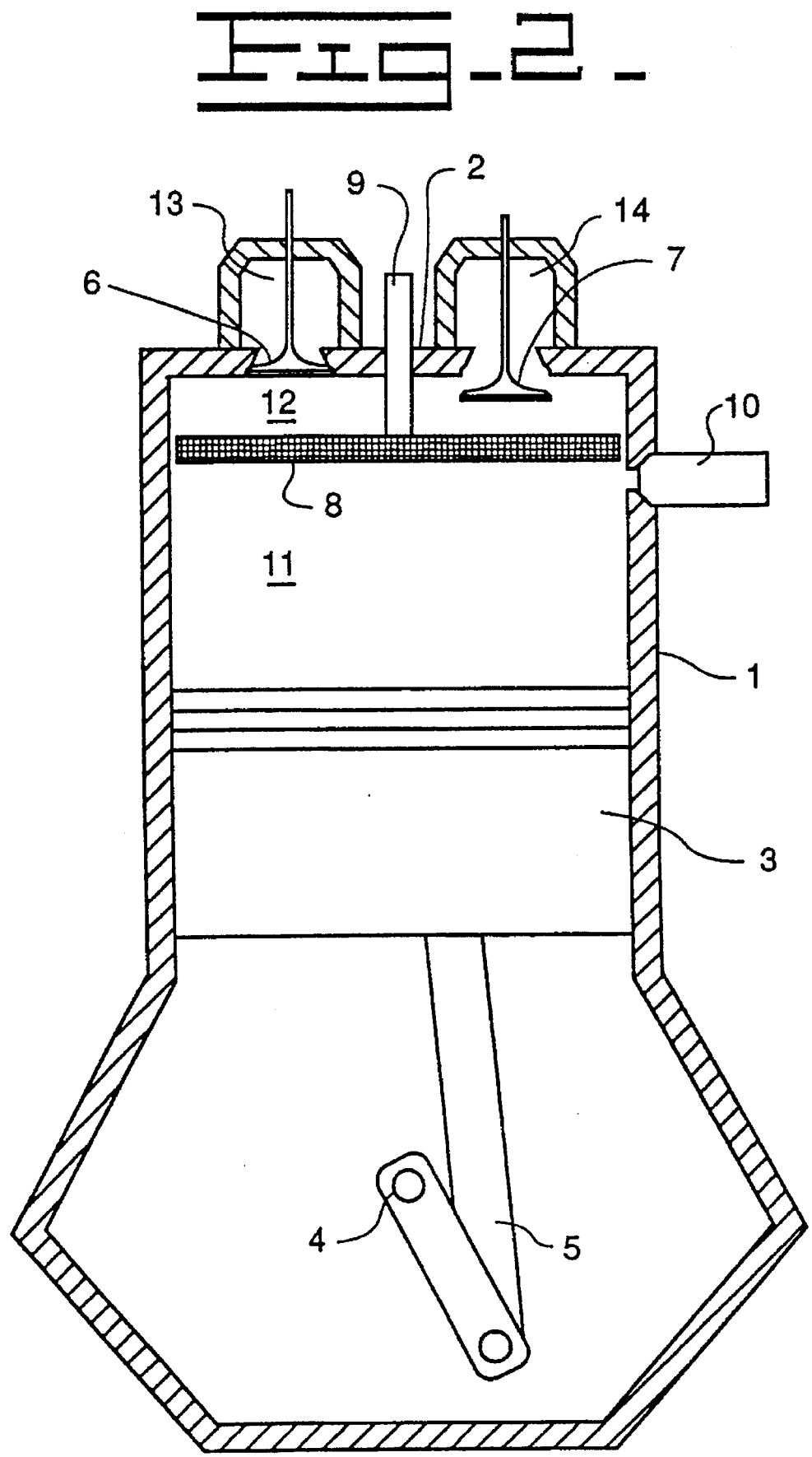
FIG. 2 is a schematic illustration of one embodiment of a hot piston regenerated engine.

FIG. 2 presents a hot piston regenerated engine. This engine can operate on either a two or a four stroke cycle. This engine is very similar to that of FIG. 1, having a cylinder (1) closed by a cylinder head (2), a piston (3) connected to a crankshaft (4) by a suitable mechanism (5), intake and exhaust valves (6 & 7) controlling flow into and out of the cylinder via intake and exhaust manifolds (13 & 14), a regenerator (8), a mechanism for moving that regenerator (9), and a fuel injector (10).

The major difference between the hot piston engine of FIG. 2 and the cool piston engine of FIG. 1 is that the combustion occurs between the piston and the regenerator. That is, the hot volume (11) now lies below the regenerator and the cold volume (12) lies above it. This requires that the fuel injector be so positioned that the fuel can be injected into the hot volume. This also requires that the working fluid enter and exit the cylinder through intake and exhaust means that communicate directly with the cold volume in the upper part of the cylinder. Thus these intake and exhaust means must provide a flow passage through the cylinder head, the upper part of the cylinder wall, the regenerator drive rod (9), or combinations of these.

The regenerated engines presented in FIGS. 1 and 2 are similar in appearance to those presented in Millman's patent and the earlier patents of Ferrenberg. However, there are substantial differences between these earlier inventions and that disclosed herein. These differences are described in the following discussion.

All regenerated, reciprocating engines have a regenerative heating stroke. This heating stroke is intended to transfer the heat stored in the regenerator to the working fluid. All of the earlier inventions of Ferrenberg perform this regenerative heating stroke "as the piston approaches the top of its stroke" or "at or near the end of the compression stroke". Furthermore, in these earlier inventions the fuel injection always occurs after the completion of this regenerative heating stroke. Millman states that "the regenerator remains at the top of the cylinder during fuel injection and during the power and exhaust strokes". Thus these earlier inventions have a regenerative heating stroke that is completed prior to fuel injection and prior to the start of the piston's expansion stroke. While simple thermodynamic analyses assuming a very thin regenerator would seem to indicate that this is the most desirable timing, more recent considerations by this inventor have shown that this sequence of events is faulty.

As the earlier patents indicate, the heating stroke should begin near the end of the piston's compression stroke. However, the engine's performance is substantially improved if the regenerative heating stroke is not completed until well into the piston's expansion stroke. Furthermore, instead of injecting the fuel after the regenerative heating stroke, the invention disclosed herein injects the fuel during the regenerative heating stroke. Furthermore, the invention disclosed herein does not complete the regenerative heating stroke until well into the piston's expansion stroke, when the pressure in the cylinder begins to drop. This timing of the regenerative heating stroke is substantially different than that of the earlier regenerated engine inventions. These differences are not just minor overlapping of processes or slight deviations in their timing. The invention disclosed herein has the processes occurring in a different order than that of the earlier inventions.

One important reason for this change in the timing of the regenerative heating stroke involves the movement of the gases within the cylinder during combustion. If the regenerator is adjacent to the piston or the cylinder head during fuel injection and combustion, as the earlier inventions indicate, then the rising pressure in the cylinder, due to combustion, will force hot gases into the regenerator. As these gases enter the regenerator they will lose heat to the regenerator, thereby reducing cylinder pressure at a time when power is being extracted. In addition to improved performance, the temperature of the hot side of the regenerator is reduced (an important regenerator durability issue) if the regenerator is moved in such a way as to prevent hot reacting components of the fuel and working fluid (e.g. combusting gases) from entering the regenerator. If the regenerative heating stroke timing proposed in the earlier inventions were applied, the regenerator would be destroyed. No reasonable regenerator material could withstand exposure to those high temperatures. The new regenerative heating stroke described herein provides an environment in which the regenerator can survive and it provides for substantially improved engine performance.

In order to prevent hot combustion gases from entering the regenerator, the motion and speed of the regenerative heating stroke must be so arranged as to maintain a flow of air from the regenerator and into the hot volume. This acts as a form of transpiration cooling for the hot surface and also prevents the very hot working fluid in the hot volume from entering the regenerator. If flow from the hot side of the regenerator (the side facing the region where combustion is occurring) is to be maintained throughout the regenerative heating stroke, then it is necessary that the regenerator move at such a speed as to prevent the pressure in the hot volume from exceeding that in the regenerator. This requires a careful and coordinated timing of the heat release rate (the fuel injection rate) and the motion of the regenerator. Once the pressure in the cylinder begins to drop during the expansion, the flow will always be out of the regenerator. This is because the working fluid within the regenerator will be expanding into the lower pressure hot volume, thereby maintaining a steady flow of working fluid out of the hot end of the regenerator.

During the compression stroke, working fluid is being compressed and driven into the regenerator. Initially this working fluid is cool and absorbs heat from the regenerator. However, near the end of the compression stroke, the air entering the regenerator is nearly as hot as the cold side of the regenerator. The compression of the air within the regenerator causes its temperature to exceed that of the regenerator. The effect of all this is that the net heat transfer from the regenerator becomes negative—that is, the regenerator is absorbing heat from the compressed working fluid. This is, of course, very undesirable and can be prevented by beginning the regenerative heating stroke at about the time this occurs. When the regenerator starts to move, the flow of large amounts of the slightly cooler working fluid into the regenerator results in much more heating of the working fluid, thereby producing a strongly positive heat transfer. Thus the regenerative heating stroke must begin during the final portion of the compression stroke.

In summary, the optimum motion and timing of the regenerative heating stroke should be as follows:

(1) Start the heating stroke at about the time that the heat transfer from the regenerator becomes negative (during the last quarter of the piston's compression stroke).

(2) Maintain the motion of the regenerator at such speeds that the flow of working fluid is always into the hot volume.

(3) Complete the regenerative heating stroke as soon as possible after the pressure in the cylinder begins to drop during the expansion stroke (usually within a few tens of degrees after TDC, but this is highly dependent upon the fuel injection rate and other factors).

These differences in the regenerative heating stroke between the regenerative engine disclosed herein and those of the earlier inventions of Ferrenberg and Millman have a large effect on the performance of the engine and the durability of the regenerator. Without these improvements the regenerated engine would not be feasible.

Another important and novel feature of the regenerated engine invention disclosed here, that is substantially different from the earlier inventions of Ferrenberg and Millman, is its regenerative cooling stroke. At some point during the piston's expansion stroke, the regenerator sweeps through the working fluid in the cylinder and extracts energy from it. This is the regenerative cooling stroke. Computations performed by this inventor clearly show that the optimum time to begin this regenerative cooling stroke is at about the time the piston's expansion stroke is half completed.

Millman's regenerated engine does not have a regenerative cooling stroke. The regenerator is simply held in a stationary position close to the valves in the cylinder head while the exhaust valve opens and the rapid depressurization (the "blowdown") occurs. The hot gases blowdown through the regenerator.

The earlier regenerated engine inventions of Ferrenberg do not start the regenerative cooling stroke until "the piston is near bottom dead center". By starting the regenerative cooling stroke near the middle of the piston's expansion stroke, the regenerated engine invention disclosed here is substantially different from and superior to the earlier inventions. The reason for this is discussed in the following:

As the regenerator sweeps through the working fluid during its cooling stroke, it cools the working fluid which reduces the pressure. As the pressure drops, the work output of engine is reduced. Thus it would seem to be desirable to delay this cooling stroke until the expansion is nearly complete and as much work as possible has been extracted from the working fluid. This is the basis for delaying the start of the regenerative cooling stroke until near the end of the expansion stroke in the earlier inventions of Ferrenberg. However, more recent and detailed computations have been performed that include the work required to move the regenerator. This work increases quite rapidly as the regenerator's cooling stroke length and speed are increased. Thus it becomes necessary to "trade off" the additional thermodynamic work provided by a full expansion prior to regenerative cooling, vs. the extra work required to move the regenerator. The computations indicate that a regenerative cooling stroke that begins near the middle of the piston's expansion stroke provides optimum performance.

These same computations indicate that engine performance is improved if this regenerative cooling stroke is completed, or nearly completed, before the exhaust means opens. This is important because if the blowdown occurs prior to the regenerator completing its sweep through the cylinder, the working fluid remaining within the hot volume expands and is cooled. This expanded working fluid can become cooler than the hot side of the regenerator and thus actually remove heat from the hotter portions of the regenerator as it passes through the regenerator. This is very undesirable as it substantially reduces engine power and efficiency. Because Millman's engine has no regenerative cooling stroke, and because the earlier inventions of Ferrenberg all open the exhaust means long before the completion of the regenerative cooling stroke, substantial blowdown through the regenerator occurs. The new invention disclosed herein prevents this by completing the regenerative cooling stroke prior to the opening of the exhaust means.

In summary, the detailed computations have shown that the regenerative cooling stroke should:

(1) begin during the middle half (between 45 and 135 degrees after top dead center) of the start of the expansion stroke, and (2) end prior to the opening of the exhaust means.

There is, of course, some flexibility in these guidelines. Second order effects not yet analyzed and other engine design and operational considerations could affect them. For example, by moving the regenerator more slowly during the cooling stroke, the power required to move the regenerator is reduced. Therefore, it might be advantageous to delay the completion of the regenerative cooling stroke until very shortly after the exhaust means are open. Whether or not this is advantageous is highly dependent upon the engine geometry, valve timing, and other factors. But in any case, the regenerative cooling stroke should be very nearly complete prior to the opening of the exhaust valve.

The previous regenerated engine inventions of Ferrenberg (U.S. Pat. Nos. 4,790,284 and 4,928,658) that operated with valves, never had the intake and exhaust valves open at the same time. The intake valve was specifically closed prior to the opening of the exhaust valve. The invention of Millman (U.S. Pat. No. 4,280,468) differs from the invention disclosed herein in many ways, most especially and very importantly in the lack of a regenerative cooling stroke. Millman makes no mention of valve opening and closing times, but his Figures imply that the exhaust closes before the intake opens. This is a serious deficiency in these earlier inventions. Regenerated engines have a special and critical need for valve overlap.

At moderate to high engine speeds the inertia of valve mechanical components, the inertia of the working fluid in the cylinder, and the shorter time available for the intake and exhaust processes, make it advantageous to maintain the exhaust valve in an open position for a short while after the intake valve opens. This will occur near the end of the exhaust process and the beginning of the intake process.

Keeping the exhaust valve open for a short while after the intake valve opens also improves the removal of spent working fluid. This is especially important in a regenerated engine as some exhaust fluid will remain trapped in the regenerator anyhow. Also, the presence of the regenerator can retard the gas exchange processes. Excessive retainment of exhaust fluid can degrade engine performance. By minimizing the trapped exhaust fluid, via overlapping valve openings, this performance degradation can be minimized.

For most operating conditions and fuel types, the temperature of the working fluid in the hot volume and the temperatures of the internal surfaces adjacent to that volume, at the time of fuel introduction, will be sufficient to rapidly ignite the fuel. Thus, an ignition source will not normally be required for a regenerated engine. It is anticipated that an ignition source will not even be required for starting, as appropriate motion of the regenerator and the compression of the air, or other means, will be sufficient to heat the regenerator and cylinder to ignition temperatures. Thus the regenerated engine invention disclosed herein has no specific ignition means (e.g. a spark plug or a glowplug)

In the earlier regenerated engine inventions of Ferrenberg, "all of the engine embodiments presented herein utilize a spark plug for ignition of the fuel". While recognizing that this ignitor may only be required for starting, such an ignition source is included in every embodiment and claim.

The earlier patent of Ferrenberg shows the preferred embodiment of the cool piston engine as having a piston that has its rings located far from the face of the piston in order to accommodate "a large annular clearance between itself and the cylinder", or "slots or other types of flow passages". The invention disclosed herein has a more conventional piston with a flat face and rings close to the face of the piston. This is done in recognition of the fact that the intake and exhaust means or the passages between these means and the cylinder can be located higher on the cylinder wall. Thus, flow around or through the piston is not required.

Computations performed by this inventor show that the efficiency of a regenerated engine improves as more energy is regeneratively transferred between the expanded combustion products and the compressed working fluid. The greater the temperature difference across the regenerator, the greater is this heat transfer and hence, engine efficiency.

Now, the regenerator's hot end temperature is primarily determined by the temperature of the combustion products that pass through it during the regenerator's cooling stroke. The temperature of the cold side of the regenerator is primarily determined by the temperature of the compressed working fluid that passes through it during the regenerator's heating stroke.

One way to increase this temperature difference is to cool the working fluid during the compression stroke. The ideal situation would be an isothermal compression. This will result in cooler compressed working fluid at the time the regenerator's heating stroke occurs and a greater temperature difference across the regenerator. This will increase the amount of regenerative heating and improve engine fuel efficiency. Isothermal compression also reduces the engine's compression work.

Given that the benefits of near isothermal compression in a regenerated engine are very great, it is now necessary to conceive of some means by which this near isothermal compression can be accomplished. One means by which this can be done is by performing a portion of the compression at a separate location from the rest of the cycle—that is, outside the cylinder. This eliminates much of the heating from cylinder walls that have been heated by combustion and allows the use of special cooling features in the compressing device that would not be possible in an engine where the compression and combustion occur in the same cylinder. Examples of these cooling features are: (a) thin walled, highly conductive materials in the compressor to remove heat, (b) cooling fins, perhaps with liquid coolant flowing through them, that are in direct contact with the working fluid as it is being compressed, (c) cooling fins on the exterior surfaces of the compression device, and (d) the use of aftercoolers in the flow passage between the compression device and the engine cylinder.

This external compressor could be another cylinder and piston, turbomachinery (e.g. a supercharger or a turbocharger), or other devices that can efficiently produce high pressure air in sufficient quantity. This compressor could "feed" several cylinders of a multi-cylinder regenerated engine.

It must be made clear that this is not simply a highly turbocharged or supercharged regenerated engine. The intent here is to replace some of the compression that occurs in the cylinder with compression in an external, cooled, compressor. The timing of the intake means is then adjusted so as to reduce the compression of the working fluid that occurs within the cylinder of the engine. For example, by delaying the introduction of much of the working fluid until the piston's compression stroke is partially complete, the effective compression is reduced.

The most important feature of this movable regenerator, regenerated engine employing external compression is that the effective compression ratio in the cylinder is less than the effective expansion ratio in the cylinder. The effective compression ratio is the volume occupied by the working fluid at the start of the compression divided by the volume occupied by the working fluid at the completion of the compression. The start of the compression is essentially the time when the intake valve or port closes and the pressure in the cylinder begins to rise. The end of compression is the time when the piston's compression stroke is completed. The expansion ratio is the volume of the working fluid at the end of the expansion stroke divided by the volume at the start of the expansion stroke. The expansion stroke is completed when the exhaust means open or the piston attains its bottom dead center position.

A regenerated engine employing this concept of external compression and lesser effective compression than expansion ratios operates in the same manner as other regenerated engines. The only major difference is the timing of the intake means and the generally much higher pressure in the intake manifolds. This concept can be applied in both two or four stroke operation, and it can be applied to both hot piston and cool piston regenerated engines.

Figure 3:
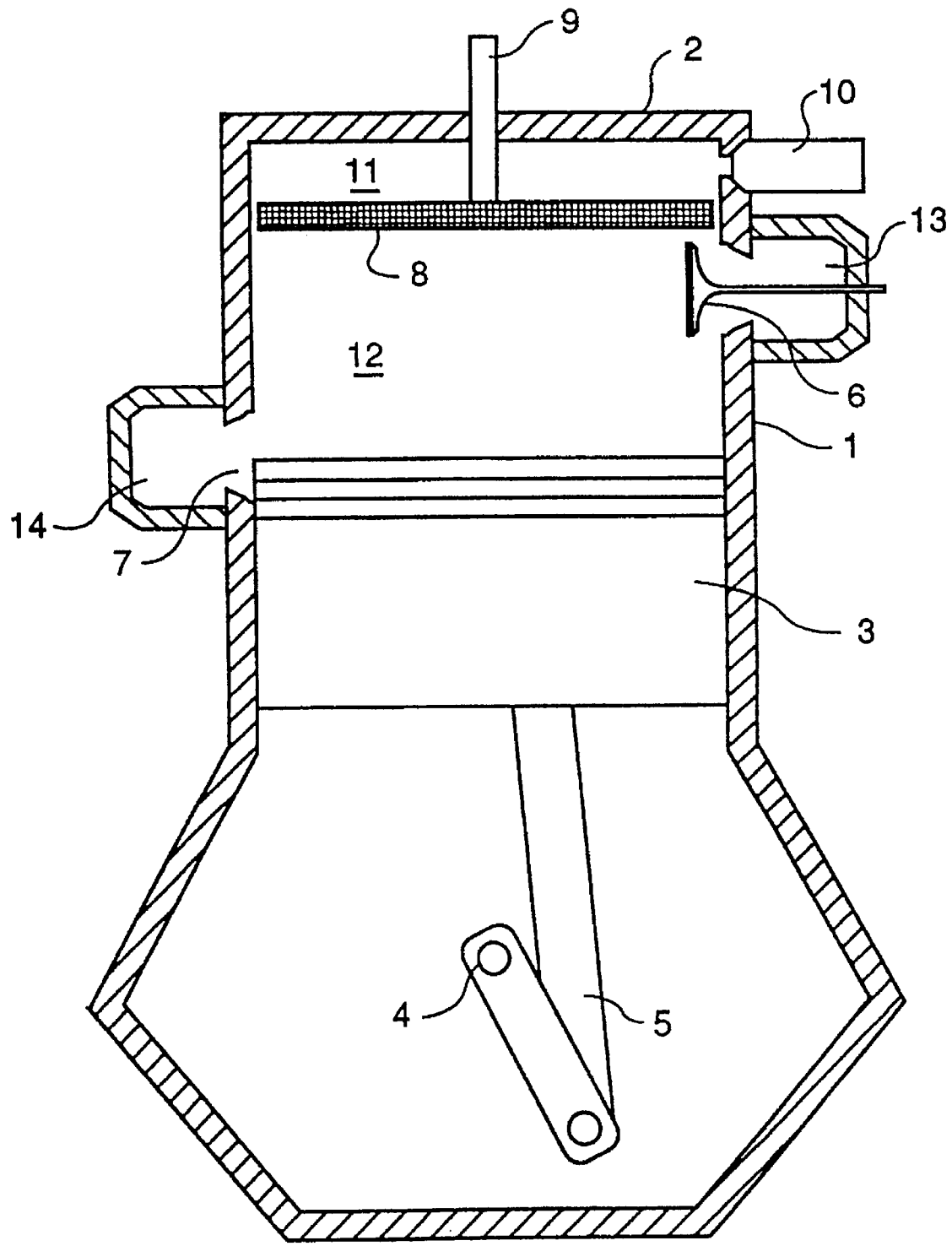
FIG. 3 is a schematic illustration of one embodiment of a cool piston regenerated engine that operates on a two stroke cycle and employs exhaust means that consist of a port that is covered and uncovered by the piston.
Figure 6E:
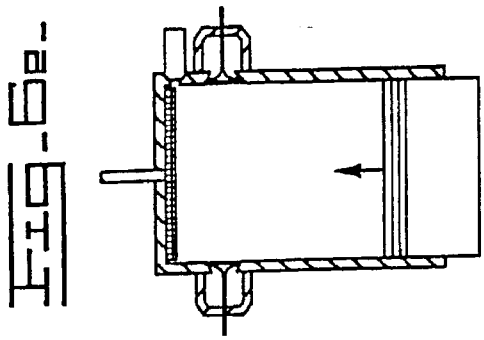
FIG. 6, a–i, depicts the operating sequence of a cool piston regenerated engine operating on a four stroke cycle and having an early closing intake valve.
Figure 6D:
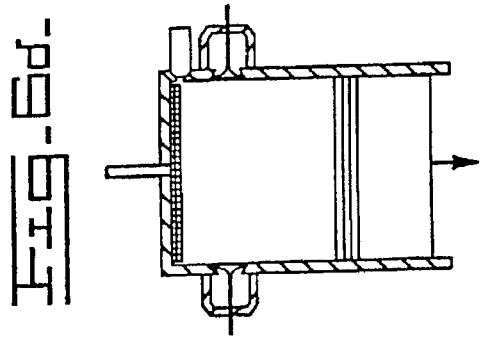
Figure 6I:
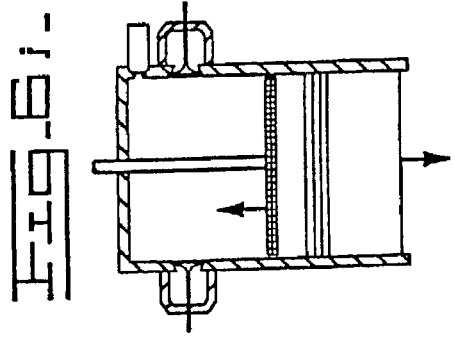
Figure 6C:
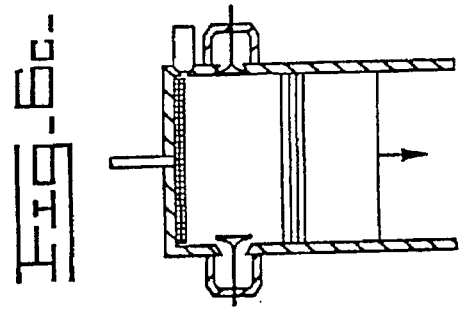
Figure 6H:
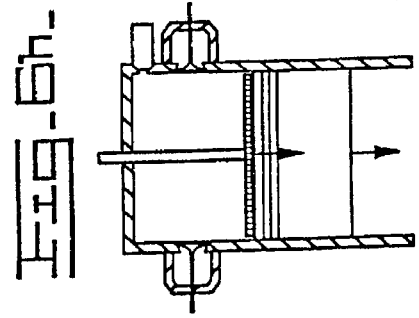
Figure 6B:
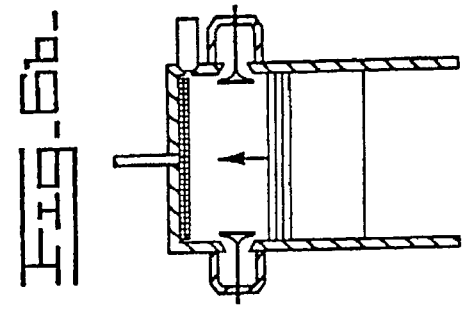
Figure 6G:
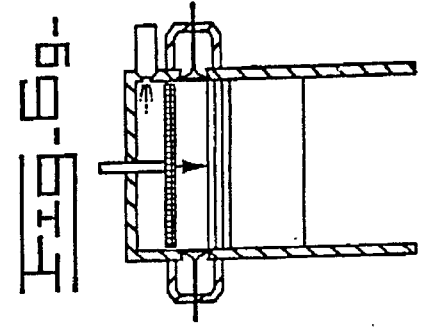
Figure 6A:
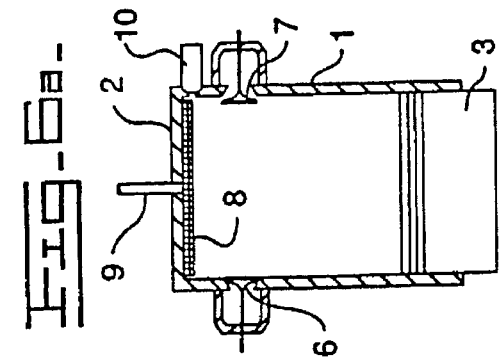
Figure 6F:
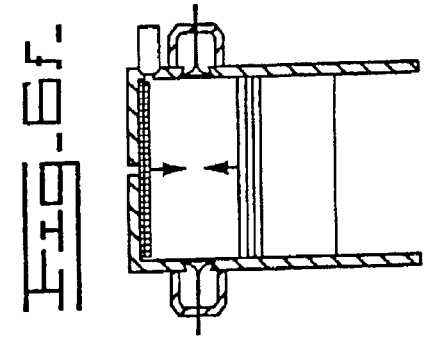
Figure 9E:
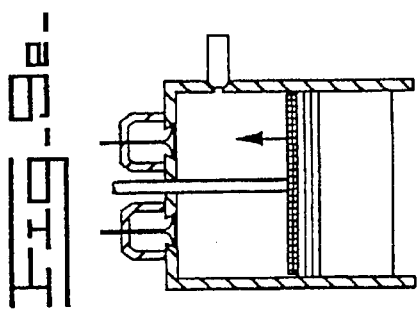
FIG. 9, a–i, depicts the operating sequence of a hot piston regenerated engine operating on a four stroke cycle and having a late closing intake valve.
Figure 9D:
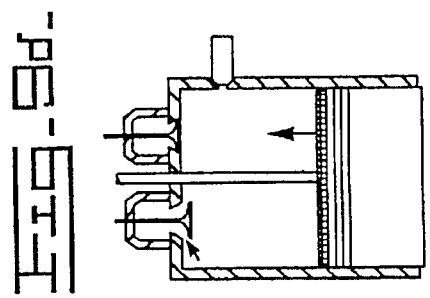
Figure 9I:
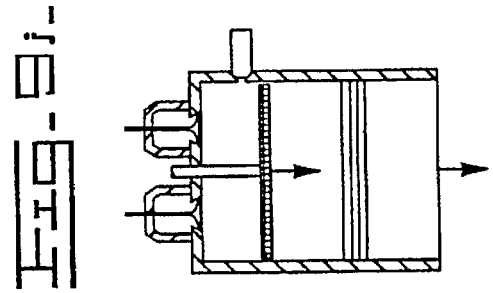
Figure 9C:
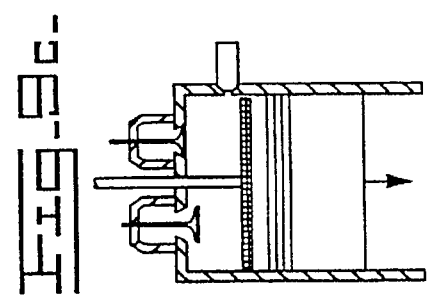
Figure 9H:
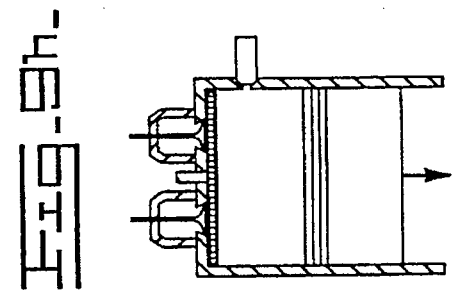
Figure 9B:
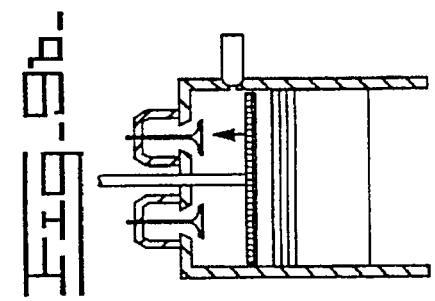
Figure 9G:
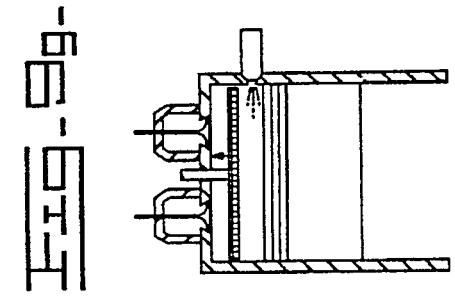
Figure 9A:
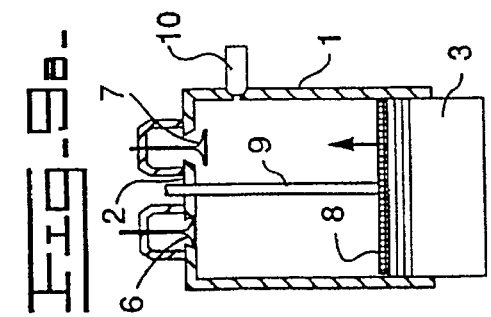
Figure 9F:
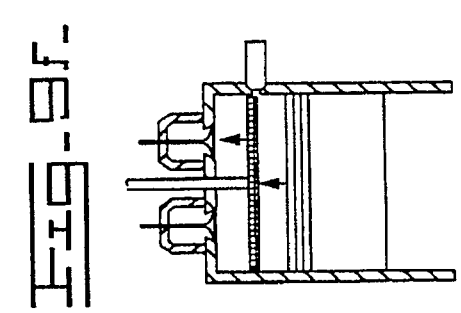

FIG. 3 presents a special type of cool piston regenerated engine employing external compression and an effective compression ratio that is less than the effective expansion ratio. This engine operates on a two stroke cycle. This engine has all the same components as the cool piston engine depicted in FIG. 1, except that the exhaust valve is replaced by a port (7) that is uncovered (opened) by the piston as it approaches its lowest position (bottom dead center), and subsequently covered (closed) by the piston shortly after it starts upward on its compression stroke. These exhaust means could also be one or more valves.

The engine of FIG. 3 is intended to operate with high pressures in the intake manifold. These pressures are to be provided by the use of compressors (not shown in FIG. 3), either singly or staged, that are powered by: (a) turbines that extract energy from the engine's exhaust gases (turbochargers) or (b) direct power take-off from the engine's crankshaft (supercharger). The compressor may be of sliding vane, centrifugal, or rotary types, including roots blowers and comprex superchargers, as well as conventional piston in cylinder compressors.

FIG. 4, a–h, presents the sequence of steps or processes occurring in a two-stroke cycle, cool piston, regenerated engine employing this concept of external compression and an effective compression ratio that is less than the effective expansion ratio. This engine is essentially the same engine as was depicted in FIG. 3, however, only the primary components of this engine are shown in FIG. 4. These are the cylinder (1), the cylinder head (2), the piston (3), the intake valve (6) the exhaust valve (7) the regenerator (8), the regenerator drive rod (9), and the fuel injector (10).

Referring to FIG. 4, at the start of the compression stroke (a) the exhaust port is open, the intake valve is closed, the regenerator is at the top of the cylinder, and the piston is at its BDC position. The hot side of the regenerator is adjacent to the cylinder head and the cold side faces the piston. Near the time that the piston begins to move upward in its compression stroke (b) the intake valve opens. For a short time both the intake valve and the exhaust port are open and the high pressure, fresh working fluid in the intake manifold forces most of the spent working fluid remaining in the cylinder out through the exhaust port. As the piston rises, the exhaust port is covered (c). As the piston continues to rise, the intake remains open for some time, thereby allowing additional pressurized working fluid to enter the cylinder. When the pressure in the cylinder rises to about the level in the intake manifold the intake valve closes (prior to d). Ideally, the pressure in the cylinder and the pressure in the intake manifold should be equal when the intake valve closes.

As the piston approaches its TDC position, the regenerator begins to move from the top of the cylinder down toward the piston (d). As it does this, the compressed working fluid is forced through the regenerator, into its cold side and out of its hot side, and absorbs heat from it. Fuel is injected into the newly formed hot volume in the cylinder between the moving regenerator and the cylinder head (e). This fuel is ignited by the high temperatures in the hot volume and reacts with the working fluid. The regenerator continues downward and meets the piston at some point (e.g. 10–60 degrees) after TDC (f). Ideally, the regenerator should meet the piston shortly after the pressure in the cylinder begins to drop during the expansion. The regenerator then follows the piston down during the expansion stroke (g), separating from it at some point long before the piston reaches BDC, and begins to travel back toward the cylinder head (h). The exhaust port is uncovered by the piston at about the time the regenerator approaches the top of the cylinder. This completes the two-stroke cycle.

FIG. 5, a–h, presents the sequence of events for a two stroke cycle, hot piston, regenerated engine employing external compression and an effective compression ratio that is less than the effective expansion ratio. This engine is the same as that of FIG. 2 except that the exhaust valve of FIG. 2 has been replaced by an exhaust port (7) in FIG. 5. The engine shown in FIG. 2 could also accomplish the cycle described here.

At the start of the compression stroke (a), the piston is at its BDC position, the exhaust port is uncovered, the regenerator is adjacent to the piston, and the intake valve is closed. The hot side of the regenerator is closest to the piston and the cold side faces the cylinder head. As the piston and regenerator begin to move upward, the intake valve opens (b) and pressurized working fluid enters the cylinder, pushing out the spent working fluid. As the piston and regenerator rise further, the exhaust port is covered (c). Fresh working fluid continues to enter the cylinder until the pressure is approximately equal to that in the intake manifold. The valve then closes (d).

As the piston and regenerator approach the top of the cylinder, the regenerator begins to move away from the piston and toward the cylinder head (e). As the regenerator moves, the compressed working fluid is forced through the regenerator, from the cold side to the hot side. As the working fluid moves through the regenerator it absorbs heat from it. Fuel is then injected into the hot volume between the moving regenerator and the piston (f). The piston completes its compression stroke and begins its expansion stroke. During the first quarter of the pistons expansion stroke, the regenerator reaches the cylinder head and remains adjacent to the cylinder head. When the piston is in the middle portion of its expansion stroke, the regenerator begins to move down toward the piston (g). The regenerator overtakes the piston at about the time the piston uncovers the exhaust port (h).

Both versions of this external compression, lower effective compression than expansion ratio, regenerated engine require that the fresh working fluid be introduced into the cylinder during the piston's compression stroke. In order to provide sufficient flow into the cylinder during the relatively short time available for intake flow, several and large intake valves could be used.

For either the cool piston or the hot piston version of this external compression, lower effective compression than expansion ratio, regenerated engine, if the pressure provided by the external compressor is reduced, then the power of the engine will be reduced. However, the fuel efficiency of the engine will still be high. This is because (1) a greater expansion to compression ratio is thermodynamically more efficient, and (2) the lower post compression temperatures provide for greater regenerative heat transfer, which further improves efficiency. Thus a lower effective compression ratio than expansion ratio is especially beneficial for a regenerated engine. Even if the external compressor is eliminated (i.e. a naturally aspirated engine), the benefits of this approach are substantial.

It should also be noted that in either of the engines presented in FIG. 4 or 5, if the intake valve is kept open after the intake and cylinder pressures are equal, the flow through the intake valve will be reversed. This will result in the expulsion of some of the fresh working fluid and a further reduction in effective compression ratio. This will reduce power, but will provide high efficiency. A similar effect can be obtained by closing the valve before the pressures are equal.

This same approach of utilizing an effective compression ratio that is less than the effective expansion ratio can also be employed in four stroke cycle regenerated engines. This is depicted in FIGS. 6 through 9.

FIG. 6, a–i, depicts the sequence of steps required to perform a four stroke cycle with an effective compression ratio less than that of the expansion ratio, in a cool piston regenerated engine. This reduction in compression ratio is accomplished by closing the intake valve during the intake stroke, thereby reducing the amount of working fluid that would be in the cylinder if the intake closing were delayed. The engine design shown in FIG. 6 for this description of the engine processes is the same as that of FIG. 1.

At the start of exhaust stroke (a), the piston is at its BDC position, the regenerator is adjacent to the cylinder head, the intake valve is closed, and the exhaust valve has just opened. The piston now moves to its TDC position, which lies just below the valves. This is the exhaust stroke whereby spent working fluid is expelled from the cylinder. As the piston approaches the end of this exhaust stroke, the intake valve is opened (b). The exhaust valve is closed as the piston begins to move toward its BDC position, thereby performing an intake stroke whereby fresh working fluid is drawn into the cylinder. At some point during this intake stroke (c) the intake valve is closed. By closing this valve early, the amount of working fluid contained within the cylinder is reduced from what it would have been had the intake valve remained open longer. This is the essential and most unique feature differentiating this operating cycle from that of other four stroke, regenerated engine operating cycles.

The piston continues its movement toward the bottom of the cylinder (d). The piston then moves from its BDC position to its TDC position, thereby performing a compression stroke whereby the working fluid is compressed. As the piston nears its TDC position, the regenerator begins to move away from the cylinder head and toward the piston (f). As it moves, the working fluid passes through the regenerator, from the cold volume below the regenerator to the hot volume above it. As the working fluid passes through the regenerator, it absorbs heat from the regenerator. Fuel is injected into the hot volume above the moving regenerator as the piston approaches its TDC position and begins to move downward in its subsequent expansion stroke (g). The regenerator moves downward faster than the piston and meets it during the first quarter of the piston's expansion stroke (h). The regenerator then moves with the piston away from the cylinder head. During the middle part of the piston's expansion stroke the regenerator reverses its direction and begins to move back toward the cylinder head (i). As it moves through the exhaust fluid, the hot exhaust fluid passes through the regenerator, from the hot to the cold side, and gives up heat to the regenerator. The regenerator reaches the cylinder head at about the time that the exhaust valve opens.

FIG. 7, a–i, depicts the sequence of steps required to perform a four stroke cycle with an effective compression ratio less than that of the expansion ratio, in a cool piston regenerated engine. This reduction in compression ratio is accomplished by keeping the intake valve open during a substantial portion of the compression stroke, causing some of the fresh working fluid to be forced out of the cylinder and thereby reducing the amount of working fluid in the cylinder. The engine design shown in FIG. 7 for this description of the engine processes is the same as that of FIG. 1.

Referring to FIG. 7, the exhaust stroke and the first portion of the intake stroke (a to b to c) are identical to those of FIG. 6. However, in FIG. 7, the intake valve remains open throughout the intake stroke and into the subsequent compression stroke (d to e). After some of the working fluid has been forced back into the intake manifold (e), the intake valve closes. The remainder of the cycle (f to i) is identical to that of FIG. 6.

FIG. 8, a–i, depicts the sequence of steps required to perform a four stroke cycle with an effective compression ratio less than that of the expansion ratio, in a hot piston regenerated engine. This reduction in compression ratio is accomplished by closing the intake valve during the intake stroke, thereby reducing the amount of working fluid that would be in the cylinder if the intake closing were delayed. The engine design shown in FIG. 6 for this description of the engine processes is the same as that of FIG. 2.

At the start of the exhaust stroke (a), the piston is at its BDC position, the regenerator is adjacent to the piston, the intake valve is closed, and the exhaust valve is open. The hot side of the regenerator is facing the piston and the cold side is facing the cylinder head. The piston then moves to its TDC position, thereby forcing spent working fluid out of the cylinder through the exhaust valve. The regenerator remains adjacent to the piston. Near the completion of the exhaust stroke (b), the intake valve opens, permitting the flow of fresh working fluid into the cylinder. The exhaust valve closes as the piston begins to move toward its BDC position, thereby performing an intake stroke whereby additional fresh working fluid enters the cylinder (c). The regenerator remains adjacent to the piston. At some time during this intake stroke the intake valve closes (d), thereby reducing the amount of working fluid that would enter the cylinder if the intake valve had remained open longer. This is the crucial and most novel step in this process.

After the intake stroke, the piston moves from its BDC position (e) to its TDC position, thereby performing a compression stroke. The regenerator remains adjacent to the piston until near the end of this compression stroke. At that point it begins to move away from the piston and toward the cylinder head (f). Fuel is introduced into the region between the moving regenerator and piston as the piston completes its compression stroke and begins it subsequent expansion stroke (g). The regenerator reaches the cylinder head during the first quarter of the piston's expansion stroke (h) and remains adjacent to the head until the piston is near the middle of its expansion stroke. The regenerator then moves toward the piston (i), reaching and remaining adjacent to the piston as the piston approaches its BDC position. This completes the cycle.

FIG. 9, a–i, depicts the sequence of steps required to perform a four stroke cycle with an effective compression ratio less than that of the expansion ratio, in a hot piston regenerated engine. This reduction in compression ratio is accomplished by keeping the intake valve open during a substantial portion of the compression stroke, causing some of the fresh working fluid to be forced out of the cylinder and thereby reducing the amount of working fluid in the cylinder. The engine design shown in FIG. 9 for this description of the engine processes is the same as that of FIG. 2.

Referring to FIG. 9, the exhaust stroke and the first part of the intake stroke (a to b to c) are identical to that of FIG. 8. Now, however, the intake valve remains open throughout the intake stroke and into the subsequent compression stroke (c to d). After some of the working fluid has been forced back into the intake manifold (d), the intake valve closes (e). The remainder of the cycle (f to i) is identical to that of FIG. 8.

All previous regenerated engine inventions are direct injection types, that is, the fuel is directly injected into the combustion region (the hot volume) of the cylinder. (Millman mentions a "carburetted" engine in connection with his hot piston regenerated engine. However, his engine lacks a regenerative cooling stroke, which makes it substantially different from, and inferior to, the regenerated engine invention disclosed herein.) It is also possible to introduced the fuel at other locations. Such approaches would include injection of fuel into the cylinder on the cold side of the regenerator, injection of the fuel into the working fluid in the intake manifold prior to its passage into the cylinder, and the use of conventional carburetors or other devices to atomize and vaporize the fuel and mix it with the working fluid prior to entering the intake manifold.

It is important to recognize that the location of injection need not be the same as the location where combustion occurs. When direct injection into the combustion region is not employed, the mixture of reactants (i.e. the fuel and the air) must, for the most part, pass through the regenerator prior to the major release of heat from it. Since there is no flow through the regenerator until the start of the regenerative heating stroke, and since the combustion should begin at about (or slightly after) the start of this heating stroke, it may be possible to provide a means for igniting the mixture that is based upon the initiation of this flow through the regenerator.

The hot side of the regenerator itself can serve as the ignition source for the mixture of reactants. The problem with this approach is that the mixture is in contact with the hot parts of the regenerator long before ignition is desired. Therefore, some feature must be provided that prevents ignition until the desired time. There are several possibilities. First, since the hot volume does not exist until the start of the regenerative heating stroke, the reactants exposed to the hot side of the regenerator will be trapped within the regenerator's porous structure. If these pores are sufficiently small, they will act like a flame arrestor and prevent (or delay) the ignition of the mixture. Then when the regenerator begins to move (the start of the heating stroke), the very hot mixture will be transported out of the regenerator where it will spontaneously react.

Another factor which will tend to delay ignition until the proper time is the compressive heating and the increase in pressure of the mixture of reactants that is occurring during the compression stroke. As the pressures and overall reactants' temperatures rise near the end of the compression stroke and the start of the regenerative heating stroke, the mixture will react more rapidly, thereby providing for timely ignition. In combination with the release of the mixture from the reaction quenching effects of the regenerator, this would provide a simple means by which ignition could be obtained.

Finally, an ignition source, such as a glowplug or spark plug, located on the hot side of the regenerator (i.e. in the hot volume) may be used to ignite the mixture of reactants flowing through the regenerator.

Figures 10A, 10B:
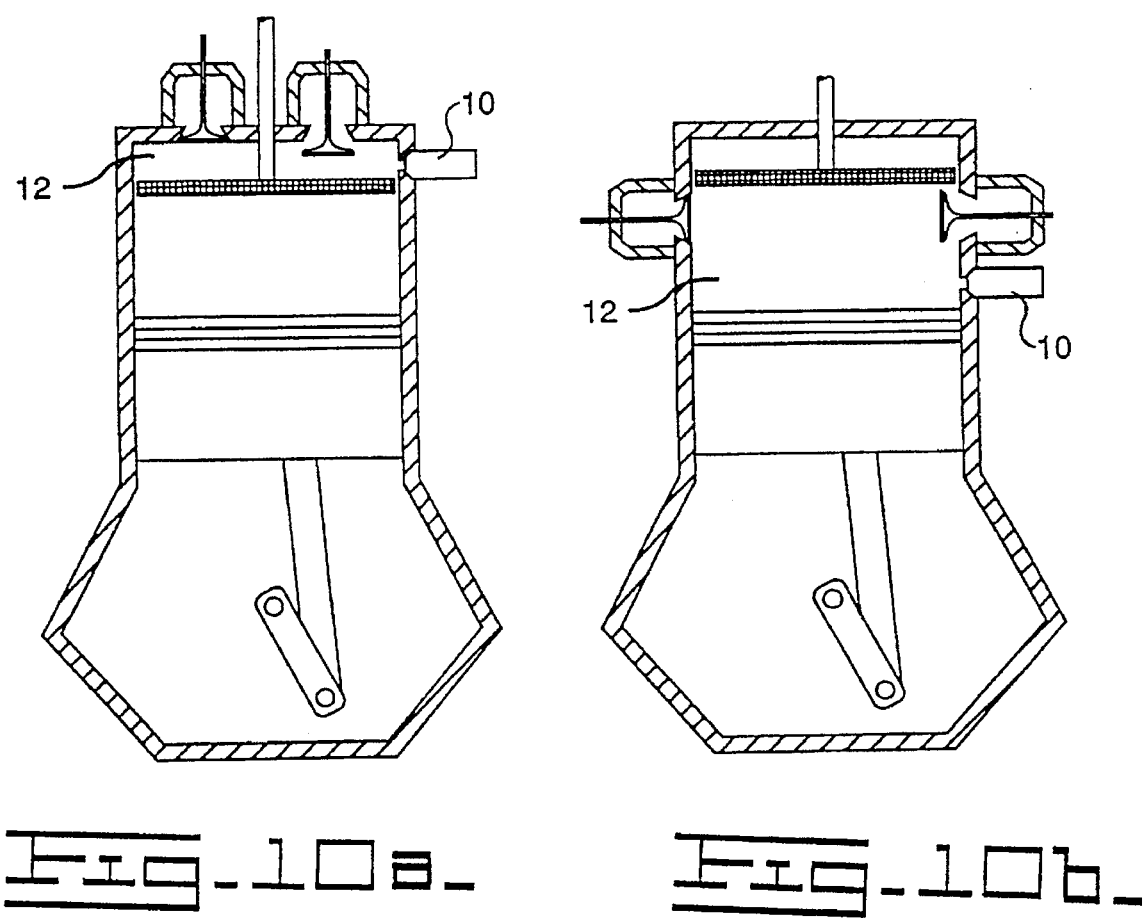
FIG. 10, a and b, presents possible placements for the fuel injector for both a hot piston regenerated engine and a cool piston regenerated engine when cold side fuel injection is employed.
Figure 14E:
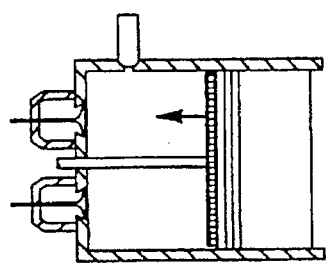
FIG. 14, a–i, depicts the operating sequence of a hot piston regenerated engine operating on a four stroke cycle.
Figure 14D:
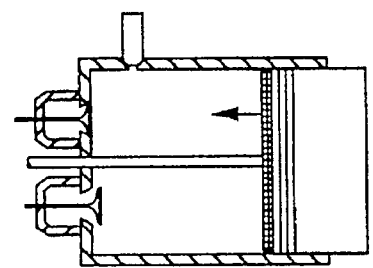
Figure 14I:
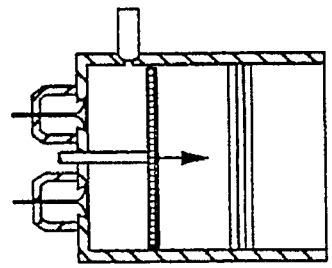
Figure 14C:
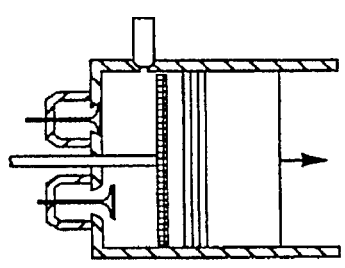
Figure 14H:
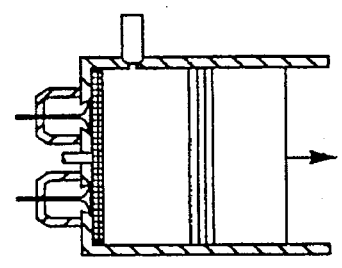
Figure 14B:
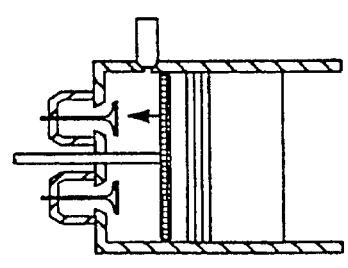
Figure 14G:
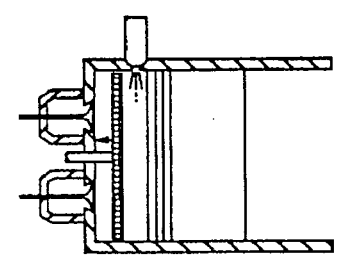
Figure 14A:
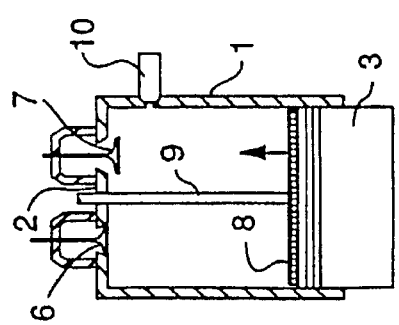
Figure 14F:
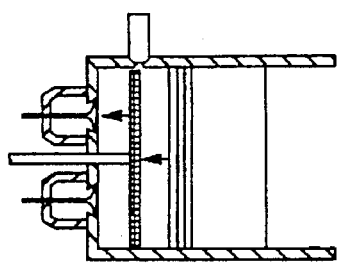
Figure 15A:
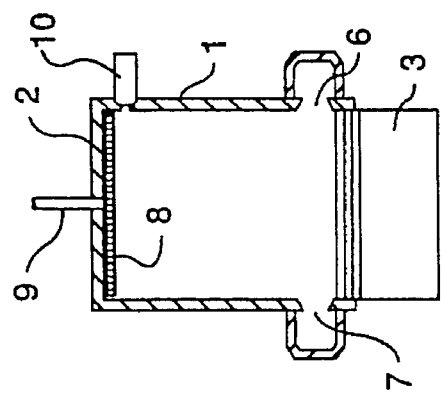
FIG. 15, a–h, depicts the operating sequence of a cool piston regenerated engine operating on a two stroke cycle.
Figure 15B:
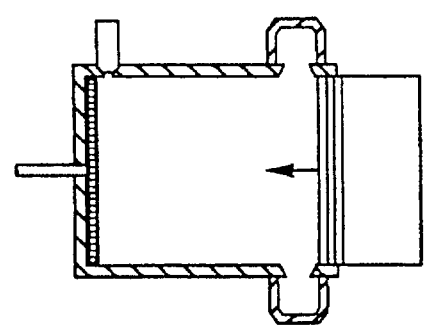
Figure 15C:
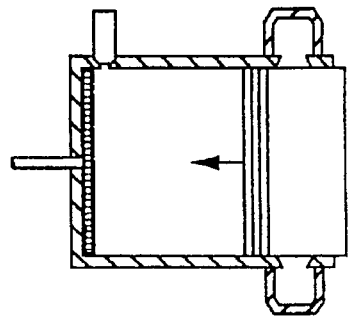
Figure 15D:
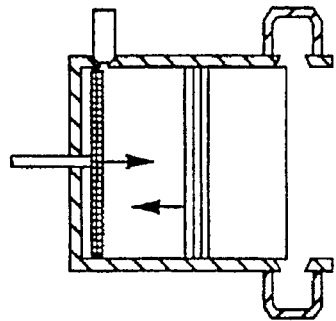
Figure 15E:
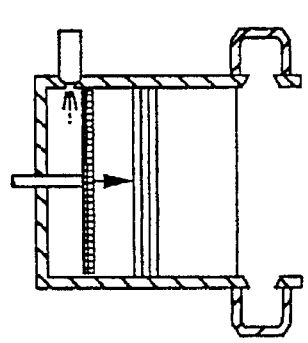
Figure 15F:
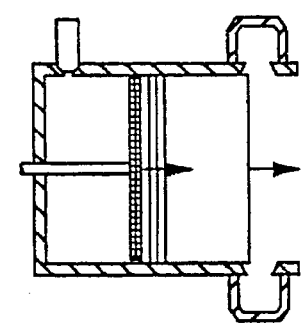
Figure 15G:
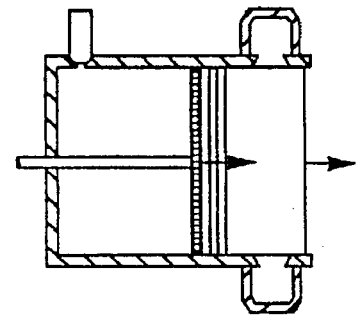
Figure 15H:
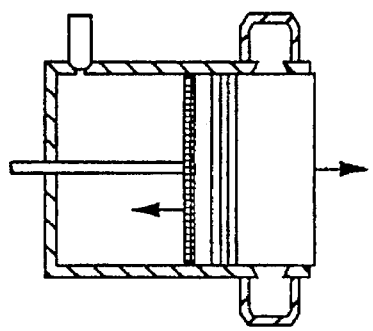
Figure 16A:
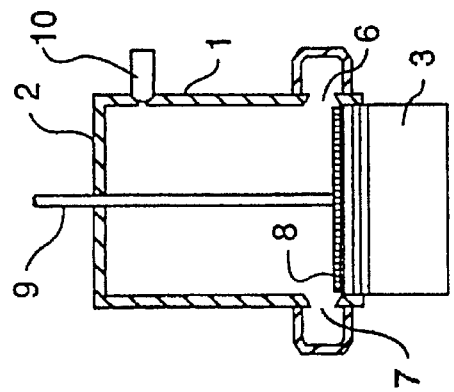
FIG. 16, a–h, depicts the operating sequence of a hot piston engine operating on a two stroke cycle.
Figure 16B:
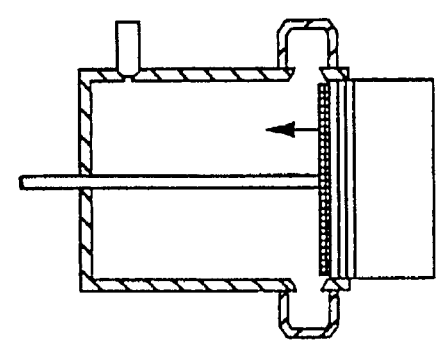
Figure 16C:
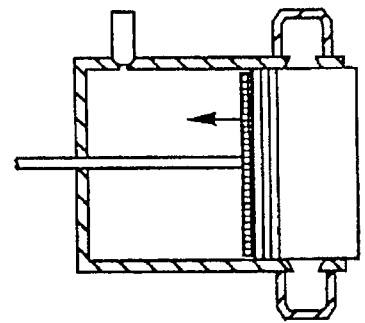
Figure 16D:
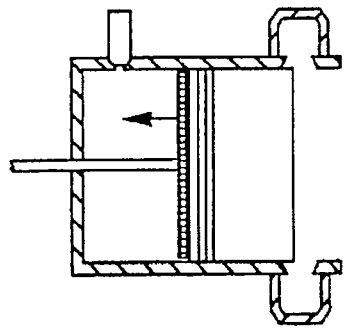
Figure 16E:
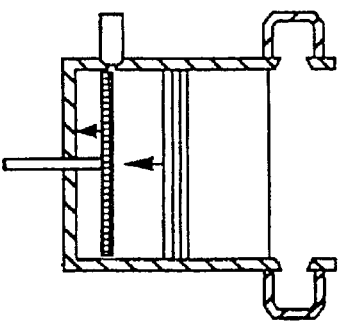
Figure 16F:
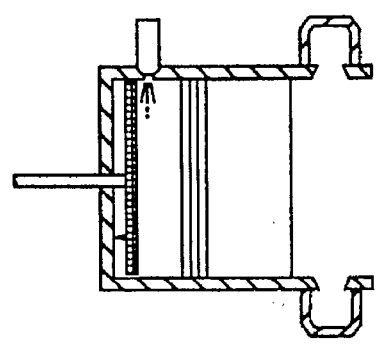
Figure 16G:
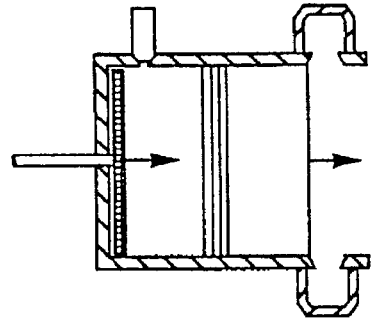
Figure 16H:
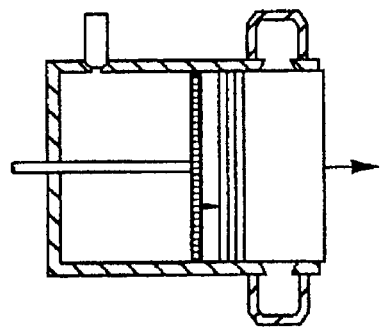

FIG. 10 presents the two regenerated engines of FIGS. 1 and 2 with the fuel injector (10) moved so as to inject fuel into the cold volume (12). (For the hot piston engine the cold volume lies above the regenerator and for the cool piston engine the cold volume lies below the regenerator.) This provides for the direct injection of fuel into the working fluid in the cold volume. This injection can occur at any time after the exhaust valve closes, that is, during the intake stroke or the compression stroke. This approach can also be applied to two stroke regenerative engines, engines employing one or more ports instead of valves, engines that have effective compression ratios that are less than their effective expansion ratios, engines with boosted intake manifold pressures, and all other types of regenerated engines.

FIG. 11 presents the two regenerated engines of FIGS. 1 and 2 with the fuel injector (10) moved so as to inject fuel into the intake manifold (13). In this way the fuel is vaporized and atomized and transported into the cylinder with the working fluid as it enters the cold volume (12) through the intake valve (6). The fuel could also be introduced at other locations in the intake manifold. It could also be introduced into the working fluid by conventional carburetors. This approach can also be applied to two stroke regenerative engines, engines employing one or more ports instead of valves, engines that have effective compression ratios that are less than their effective expansion ratios, engines with boosted intake manifold pressures, and all other types of regenerated engines.

One major concern with most regenerated engine designs is the placement and size of the intake and exhaust means. In all regenerated engines, the working fluid must flow into and out of the cold volume. For a cool piston regenerated engine this means that the flow passages must be in the piston, the cylinder wall below the cylinder head, the regenerator, or combinations of these. None of these are common in conventional engines, although engines having ports in the wall of the cylinder that are covered and uncovered by the piston are common for many two stroke engines. Placing valves in the cylinder wall, especially flush mounted valves as have been shown in many of the previous Figures, would be a difficult and challenging task.

For hot piston regenerated engines, the valves can be placed in the cylinder head, a more conventional placement. However, if the regenerator drive rod also penetrates the head, the space available for these valves will be reduced. Since larger valves are always desirable for improved volumetric efficiency, this could present a problem.

In order to improve this valve sizing and placement situation for both hot and cold piston engines, the regenerator drive rod can be used as a means to flow working fluid into, out of, or into and out of, the cylinder. This can be accomplished by using a tube as the regenerator drive rod and suitably connecting it to the intake or exhaust manifolds, or both. It is expected that the flow through the tube will only provide a portion of the intake or exhaust flow, and probably not both. However, it is possible that all of the intake flow or exhaust flow or both could be provided by a drive rod with a sufficiently large inside diameter or by multiple drive rods. A single rod that provides both intake and exhaust flow is shown in FIG. 12.

FIG. 12 presents two different versions of a regenerator drive rod that also functions as a means to intake and exhaust working fluid. Each of these Figures shows the two ends of the drive rod. The two versions shown are applicable to the two possible situations: (12a) the regenerator drive rod attaches to the regenerator from the hot side of the regenerator (i.e. the rod passes through the hot volume), and (12b) the regenerator drive rod attaches to the regenerator from the cold side of the regenerator (i.e. the rod passes through the cold volume). For example, configuration (12a) could be applied to a cool piston regenerated engine with the drive rod entering the cylinder through the cylinder head.

Referring to FIG. 12a, the regenerator (8) is attached to the drive rod (9) by means of a structure (20) which is shown here as a flange attached to the lower end of the drive rod and embedded in the cold side of the regenerator. The rod (actually a tube) passes through the regenerator and provides an opening (29) from its interior to the cold volume on the cold side of the regenerator. The interior of the tube contains a flow control device hereafter referred to as a check valve (21). This check valve only permits flow through the rod (in either direction) when the pressure in the cylinder is equal to, or only slightly greater than, the pressure in the upper part of the drive rod. That is, the valve is open during the intake and exhaust strokes when the pressure in the cylinder is relatively low.

Near the other end of the drive rod, the rod has openings (26 and 27) that are connected by valves (22 and 23) to the intake manifold (24), and the exhaust manifold (25). At the appropriate times in the engine's operating cycle either the intake valve (22) or the exhaust valve (23) will be open. If the pressure in the cylinder is low enough, and if either of the valves is open, then flow through the rod will occur.

In FIG. 12b, the regenerator (8) attaches to the rod (9) via a structure (20) that is shown here as a flange attached to the lower end of the drive rod and imbedded in the cold side of the regenerator. Since the flow through the rod must enter and exit the cold volume, holes (28) are provided in the tube at some location above the regenerator attach point. The end of the tube is closed so that no flow passes into or through the regenerator. The check valve (21) and the upper end of the drive rod are identical to that of FIG. 12a.

The use of the regenerator drive rod as a means for intake flow is especially useful when applied to the cool piston, two stroke, regenerated engine of FIG. 3. In this case the flow through the drive rod can replace all, or a part of, the flow through the intake valve. If the drive rod provides the only intake flow path, then the intake valve shown in FIG. 3 will be eliminated. Since the regenerator is at the top of the cylinder throughout the intake and exhaust processes, the scavenging provided by having flow entering at the center and top of the cylinder and exiting at the bottom periphery is excellent. Vanes and other flow dispersion or swirl devices can be added within the drive rod if desired to further promote scavenging.

In a regenerated engine it is important that the regenerator be able to sweep through all of the internal cylinder volume. If regions exist within the cylinder that the regenerator cannot pass through, then these regions can "shelter" a part of the working fluid from the regenerative heating and cooling processes. Compressed working fluid that is trapped in these regions cannot be regeneratively heated, and hot exhaust fluids trapped in these regions cannot have their thermal energy extracted by the regenerator. This reduces the efficiency of the engine.

Now, previous cold piston regenerated engines operating with valves (Ferrenberg, U.S. Pat. Nos. 4,790,284 and 4,928,658) placed these valves in passages that were connected to the cylinder. These passages shelter a portion of the working fluid, as previously discussed, thereby substantially reducing engine performance. Accordingly, it is highly desirable to minimize the size of these passages. One way to do this is to mount the valves so that they are flush with the cylinder wall when closed. Flush mounting implies that the valves will perfectly conform to the shape of the internal wall of the cylinder, thereby providing flow passages of zero volume between the valves and the cylinder. This is why all of the valves shown in all of the Figures are flush mounted.

It must be recognized that perfect flush mounting is a goal and that some deviation from this can be accepted with minimal performance losses. For example, in order to use flat bottomed, round, poppet valves a flat region could be made in the interior wall of the cylinder that would accommodate and seat the valve. This would provide only a very small region that could not be swept by the regenerator. Valves that are flush mounted in the cylinder wall, or are nearly flush mounted as just described, are referred to as "flush mounted" or "substantially flush mounted" valves. For purposes of this patent application, these two descriptions have the same meaning.

Ports or openings in the cylinder wall or an annular sleeve also effectively act as flush mounted valves in that they provide no volume that can shelter working fluid from the regenerator.

Valves in the cylinder wall may be so located that the piston face or the piston rings may or may not pass over them. Valve timing will, of course, be critical, especially if they are so located that the piston can impact them when open. It may also be possible to employ valves that open outward from the cylinder. Finally, the valves of any of the engines discussed herein can be operated by a variety of mechanisms, including conventional or hydraulic lifters and rocker arms, valve mechanisms that provide variable timing (as a function of engine speed or load), and electromechanical (solenoid operated) mechanisms.

Valve opening overlap, realistic and feasible regenerator heating stroke timing and motion, the use of a regenerative cooling stroke, and realistic and feasible regenerator cooling stroke timing and motion are all included in the regenerated engine operating sequences shown in FIGS. 13–16. The operating sequences presented in these Figures differ from those of FIGS. 4–9 in that these engines are not intended to have effective compression ratios that are substantially different from the effective expansion ratios.

FIG. 13, a–i, presents the sequence of operations of a cool piston, regenerated engine operating on a four stroke cycle. The engine shown is the same as that of FIG. 1, but only the major components are shown. These are: the cylinder (1), the cylinder head (2), the piston (3), the intake valve (6), the exhaust valve (7), the regenerator (8), the regenerator drive rod (9), and the fuel injector (10).

The sequence starts with the piston near its BDC position, the regenerator adjacent to the cylinder head, the intake valve closed, and the exhaust valve having just opened (a). The piston then moves to its TDC position thereby performing an exhaust stroke whereby spent exhaust fluid is forced out the exhaust valve. Near the end of this exhaust stroke the intake valve opens (b). The piston then begins to move away from its TDC position in its intake stroke. The exhaust valve closes (c) and the piston then moves to its BDC position, thereby completing the intake stroke and introducing fresh working fluid into the cylinder. During the early part of the piston's subsequent compression stroke, the intake valve remains open (d). It only remains open for a long enough time to assure that as much working fluid as possible has entered the cylinder. It is not intended that it stay open long enough for working fluid to be forced back out the intake valve (as was the case for the engine operation presented in FIG. 7).

The intake valve then closes and the piston proceeds to perform the remainder of its compression stroke (e). Just before the completion of this compression stroke the regenerator begins to move away from the cylinder head and toward the piston in its regenerative heating stroke (f). As the piston completes its compression stroke and begins its expansion stroke, fuel is injected into the space between the moving regenerator and the cylinder head (g). As the fuel reacts with the working fluid and the piston continues its expansion stroke, the regenerator continues to move toward the piston. The motion and timing of this portion of the regenerative heating stroke are such that the flow through the regenerator is always toward the hot volume, where the fuel is reacting. During the first quarter of the piston's expansion stroke, the regenerator overtakes the piston and continues to move with it (h). When the piston's expansion stroke is about half complete, the regenerator reverses its direction and begins to move back toward the cylinder head in its regenerative cooling stroke (i). The regenerator completes this cooling stroke as the piston approaches its BDC position and the exhaust valve opens. This completes the operating cycle.

FIG. 14, a–i, presents the sequence of operations of a hot piston, regenerated engine operating on a four stroke cycle. The engine shown is the same as that of FIG. 2, but only the major components are shown. These are: the cylinder (1), the cylinder head (2), the piston (3), the intake valve (6), the exhaust valve (7), the regenerator (8), the regenerator drive rod (9), and the fuel injector (10).

The operating cycle begins with the piston at its BDC position, the regenerator adjacent to the piston, the intake valve closed and the exhaust valve having just been opened (a). The piston then moves to its TDC position, thereby performing an exhaust stroke whereby the spent working fluid is expelled from the cylinder. The regenerator remains adjacent to the piston throughout this exhaust stroke. Near the completion of this exhaust stroke the intake valve opens (b). The piston then moves from its TDC position to its BDC position, thereby performing an intake stroke and introducing fresh working fluid into the cylinder through the intake valve. Near the start of this intake stroke the exhaust valve is closed (c). The regenerator remains adjacent to the piston throughout this intake stroke. During the early part of the piston's subsequent compression stroke, the intake valve remains open (d). It only remains open for a long enough time to assure that as much working fluid as possible has entered the cylinder. It is not intended that it stay open long enough for working fluid to be forced back out the intake valve (as was the case for the engine operation presented in FIG. 9).

The intake valve then closes and the piston proceeds to perform the remainder of its compression stroke (e). The regenerator remains adjacent to the piston. Just before the completion of this compression stroke the regenerator begins to move away from the piston and toward the cylinder head in its regenerative heating stroke (f). As the piston completes its compression stroke and begins its expansion stroke, fuel is injected into the space between the moving regenerator and the piston (g). As the fuel reacts with the working fluid and the piston continues its expansion stroke, the regenerator continues to move toward the cylinder head. The motion and timing of this portion of the regenerative heating stroke are such that the flow through the regenerator is always toward the hot volume, where the fuel is reacting. During the first quarter of the piston's expansion stroke, the regenerator reaches the cylinder head and remains adjacent to it (h). When the piston's expansion stroke is about half complete, the regenerator begins to move back toward the piston in its regenerative cooling stroke (i). The regenerator completes this cooling stroke, reaching and remaining adjacent to the piston, as the piston approaches its BDC position and the exhaust valve opens. This completes the operating cycle.

FIG. 15, a–h, presents the sequence of operations for a cool piston regenerated engine operating on a two stroke cycle. Only the major components of this engine are shown. These are: the cylinder (1), the cylinder head (2), the piston (3), the intake port (6), the exhaust port (7), the regenerator (8), the regenerator drive rod (9), and the fuel injector (10). Either or both of the intake and exhaust ports could be replaced by valves, which would provide greater flexibility in the opening and closing times. The intake port is located slightly lower than the exhaust port so that the exhaust port is uncovered by the piston prior to the intake port.

The sequence starts with the piston near its BDC position, the regenerator adjacent to the cylinder head, and the intake and exhaust ports having just been opened (a). While the piston is at and near to its BDC position, fresh working fluid flows in through the intake port and forces spent working fluid out of the exhaust port. The piston then begins to move toward the cylinder head (b) covering the intake port and then the exhaust port (c). The piston then moves to its TDC position, thereby performing a compression stroke and compressing the working fluid trapped in the cylinder. Just before the completion of this compression stroke the regenerator begins to move away from the cylinder head and toward the piston in its regenerative heating stroke (d). As the piston completes its compression stroke and begins its expansion stroke, fuel is injected into the space between the moving regenerator and the cylinder head (e). As the fuel reacts with the working fluid and the piston continues its expansion stroke, the regenerator continues to move toward the piston. The motion and timing of this portion of the regenerative heating stroke are such that the flow through the regenerator is always toward the hot volume, where the fuel is reacting. During the first quarter of the piston's expansion stroke, the regenerator overtakes the piston and continues to move with it (g). When the piston's expansion stroke is about half complete, the regenerator reverses its direction and begins to move back toward the cylinder head in its regenerative cooling stroke (h). The regenerator completes this cooling stroke as the piston approaches its BDC position. This completes the operating cycle.

FIG. 16 presents the sequence of operations for a hot piston regenerated engine operating on a two stroke cycle. The engine is identical to that shown in FIG. 15 and has the same components.

The operating cycle begins with the piston at its BDC position, the regenerator adjacent to the piston, and the intake and exhaust ports having just been opened (a). The piston and regenerator then move together toward the cylinder head, thereby covering the intake port and subsequently the exhaust port (b–c). The piston then moves to its TDC position (d), thereby performing the remainder of its compression stroke. The regenerator remains adjacent to the piston. Just before the completion of this compression stroke the regenerator begins to move away from the piston and toward the cylinder head in its regenerative heating stroke (e). As the piston completes its compression stroke and begins its expansion stroke, fuel is injected into the space between the moving regenerator and the piston (f). As the fuel reacts with the working fluid and the piston continues its expansion stroke, the regenerator continues to move toward the cylinder head. The motion and timing of the regenerative heating stroke are such that the flow through the regenerator is always toward the hot volume, where the fuel is reacting. During the first quarter of the piston's expansion stroke, the regenerator reaches the cylinder head and remains adjacent to it. When the piston's expansion stroke is about half complete, the regenerator begins to move back toward the piston in its regenerative cooling stroke (g). The regenerator completes this cooling stroke, reaching and remaining adjacent to the piston, as the piston approaches its BDC position (h). This completes the operating cycle.

The regenerator provides an excellent catalyst support structure. It has a large surface area and nearly all of the working fluid passes through it twice during each cycle. It is at a high temperature which is often desirable for many chemical reactions. Catalysts are utilized to promote the destruction of pollutants, such as oxides of nitrogen, and they are also used to promote or initiate combustion. For example, catalysts could be placed on and in a regenerator to increase the reactivity of the fluid passing through it. If the fluid contained fuel, then this increase in reactivity could serve to ignite it. Otherwise, this increase in reactivity would cause preliminary chemical reactions that enhance the ignition or reaction of the working fluid as it flows into the hot volume. Catalysts could also be used to promote the reaction of any particulate matter (e.g. soot) or other incompletely reacted fuel products that pass into the regenerator. In the presence of appropriate catalysts, the carbon soot and any hydrocarbons trapped in the regenerator could serve as reducing agents for oxides of nitrogen.

Catalysts can be deposited upon the internal surfaces of all or a portion of the regenerator. Catalysts that function best at high temperatures can be placed within the hotter regenerator sections, while those that require lower temperatures can be placed within the cooler sections. The wide temperature gradient across the regenerator provides a selection of temperature regimes. Regenerators with catalytic coatings can be used to promote or retard combustion (or both, depending upon the local and current temperature) and/or to promote the destruction of pollutants (e.g. oxides of nitrogen, unburnt hydrocarbons, and soot).

The regenerator of a regenerated engine is a porous material through which the working fluid will flow and exchange energy with the regenerator—that is, it is an alternating flow heat exchanger. The small openings within the regenerator through which the working fluid flows can be of uniform shape and size (as in a honeycomb or a screen) or they can be of a variety of shapes and sizes (as in ceramic foams made from reticulated plastic foam). If the openings are of nonuniform size or shape, they are generally assigned some average value. For example, with reticulated plastic foams and their derivatives, which have pores of nonuniform size, the foam pore size is generally reported in terms of a number of pores per inch—an average value. While all the pores are not of this size, an 80 pore per inch foam will have smaller flow passages on average, then a 40 pore per inch foam. Thus whether the regenerator material has flow passages of uniform size and shape or nonuniform size and shape, each such material can be assigned an average or representative value for the size of its flow passages. In the following discussion, all reference to flow passage sizes refers to the material's average flow passage size.

When designing a regenerator the first thought is to use a single material for the regenerator heat transfer and storage medium. The previous inventions of Ferrenberg and that of Millman are of this type. However, there are many reasons to use different regenerator materials as shown in the following examples.

As with all heat exchangers, it is advantageous to have a high surface area to promote rapid heat transfer and large flow passages to minimize pressure drop. Unfortunately, large flow passages generally result in lower surface areas. In the regions of the regenerator where the temperatures are lower, the density of the gas flowing through will be lower.

This means that the velocity of the gas in these cooler regions will be lower and the pressure drop across these regions will be much lower. This phenomena can be used to construct a regenerator that maximizes heat transfer surface area while minimizing pressure drop. If the regenerator is constructed with smaller size flow passages in its cooler regions, the pressure drop can be minimized while the surface area is maximized.

Another advantage of using materials having flow passages of different average size is that particles (e.g. soot) are more readily trapped in regions of smaller flow passages. By placing the smaller flow passage material in a region with beneficial thermal conditions it is possible to capture and contain these particles in that region. The temperatures in these regions may be more conducive to the combustion of these particles or for the use of catalysts on the regenerator's internal surfaces that promote desirable chemical reactions with the captured particles.

Figure 17B:
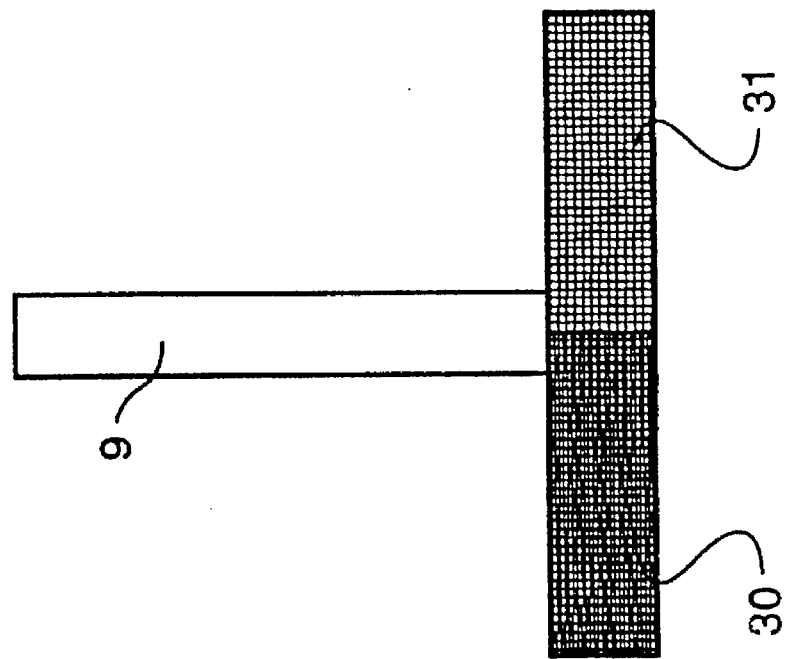
FIG. 17, a and b, presents two possible ways by which regenerator materials having different flow passage sizes may be employed in a single regenerator.
Figure 17A:
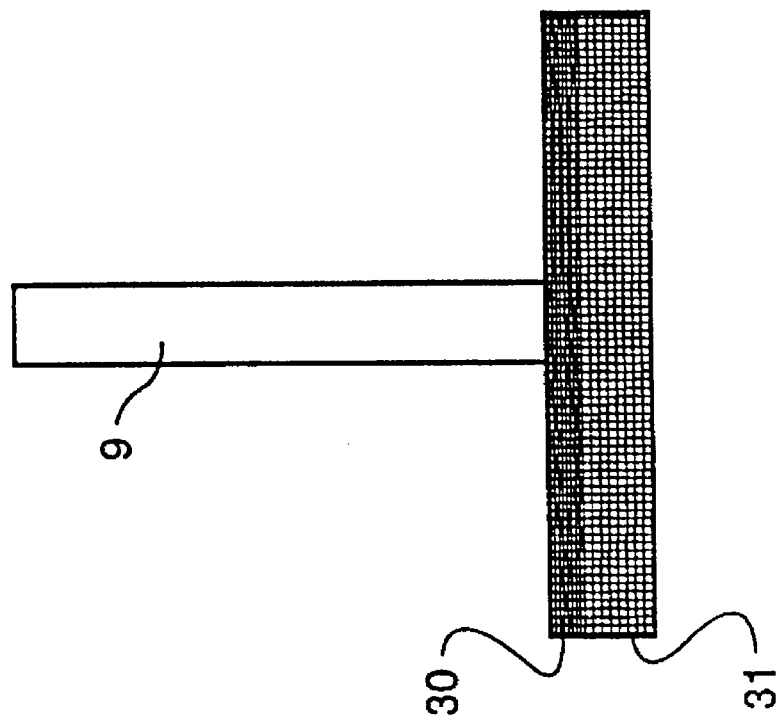
Figure 18C:
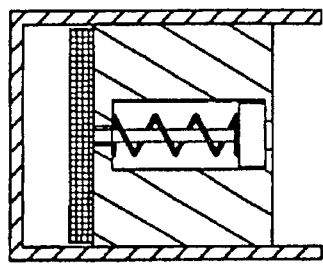
FIG. 18, a–e, presents a sequence of events by which a pneumatic lifter may be used to control the positioning and motion of a regenerator.
Figure 18B:
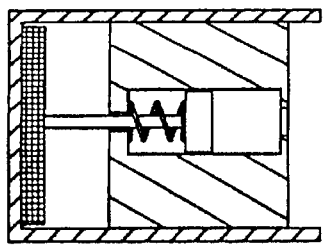
Figure 18E:
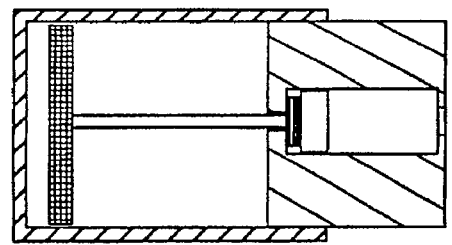
Figure 18A:
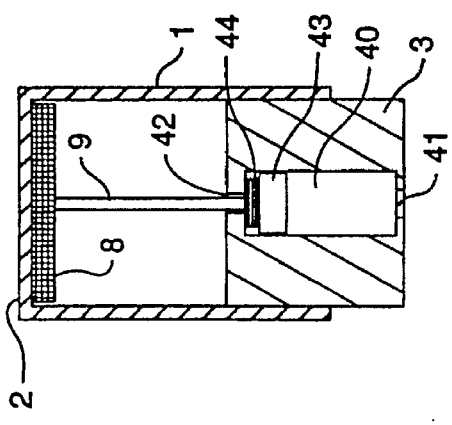
Figure 18D:
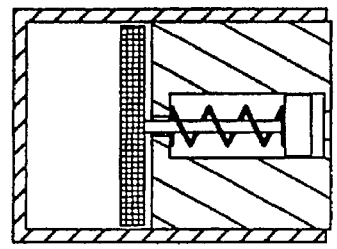

As an example, FIG. 17a presents a regenerator design based upon this principle. The upper region of the regenerator (30) lies on the hot side of the regenerator. This upper region is composed of a material with smaller flow passages (for example, 100 pore per inch silicon nitride foam). The remainder of the regenerator (31) is composed of a material with larger flow passages (for example, 70 pore per inch silicon carbide foam). Most combustion generated soot particles will be captured in the smaller flow passages of the hot side region where the temperatures are highest. This will promote the oxidation of this soot, thereby reducing soot emissions from the engine.

Smaller passages often provide greater structural strength in the regenerator material. These regions of smaller flow passages can be so arranged as to improve the overall stiffness and strength of the regenerator. For example, the regenerator can be constructed with narrow, radial arms of smaller flow passage foam extending outward from the center of the regenerator.

Finally, the flow through the regenerator during the regenerative heating stroke has a beneficial effect on the combustion. This effect is due to the turbulence that the regenerator will produce in the combustion region just before and during the combustion. The regenerator can also be designed to provide substantial swirl to the working fluid entering the combustion region. This is done by varying the flow passage sizes in different sectors of the regenerator. The intent is to produce a greater flow through the regenerator in some areas and a lesser flow in others. This will result in large scale turbulence and swirl in the combustion region.

FIG. 17b demonstrates how this concept can be applied in practice. The left half of the regenerator (30) is constructed of a material having smaller flow passages. The right side (31) is constructed of a material with larger flow passages. During the regenerative heating stroke, the flow through the regenerator will be greater on the right side than on the left side, resulting in a swirling motion in the hot volume.

A new class of materials has been discovered that offers great promise for use in the regenerator. These materials are referred to as "ceramic foams". They are made from, and have the general shape of, common, reticulated (open cell) plastic (e.g. polyurethane) foams. The plastic foam is converted to a carbon foam and then coated with a ceramic, refractory, or other material. The carbon foam can then be removed, leaving only the ceramic. The coating process may be accomplished in several ways, including ceramic slurry deposition and chemical vapor deposition or infiltration. The end result is a ceramic foam—a skeletal structure consisting of a large number of nonuniform, unaligned, interconnected cells or pores separated by ligaments of solid material. These ceramic foams can be formed from many different materials including common and refractory metals, silicon carbide, silicon nitride, and ceramics. Some minimal structure may be required to provide support for the ceramic foam, especially where it is attached to the drive rod.

Regenerated engines require a driving means to move the regenerator at the appropriate times in the cycles. Some potential drive mechanisms are:

1. The regenerator may be moved by one or more drive rods passing through the cylinder head. The movement of these rods can be controlled by cams, chains (e.g. a timing chain), gears, linkages, hydraulic actuators, electrical solenoids, combinations of these, or other common means.
2. The regenerator may be moved by one or more drive rods passing through the piston. The movement of these rods can be controlled by cams, chains, gears, linkages, hydraulic actuators, electrical solenoids, combinations of these, or other common means. Any of the means employed in Stirling engines to move a displacer (in some Stirling engines the displacer is also a regenerator), such as the crank device referred to as a "rhombic drive", can be employed to move regenerator drive rods.
3. The regenerator may be moved by a cylindrical annular sleeve passing between the piston and the cylinder wall. The movement of the sleeve can be controlled by cams, chains, gears, linkages, hydraulic actuators, electrical solenoids, combinations of these, or other common means.
4. The regenerator may be moved, fully or in part, by a device hereafter referred to as a pneumatic regenerator lifter and described in the following.

A pneumatic regenerator lifter makes use of the pressures within the cylinder and the dynamic forces acting on the regenerator to provide all or part of the force required to move and position the regenerator. In a cold piston regenerated engine the regenerator remains adjacent to the cylinder head except for one movement down to the piston (the regenerative heating stroke) and a return movement (the regenerative cooling stroke). Similarly, the regenerator in a hot piston engine remains adjacent to the piston except for one movement to the cylinder head and a return. The pneumatic lifter is based upon the fact that the cylinder pressure is highest whenever the regenerator is required to accomplish these movements.

There are a large number of ways by which this concept of a pneumatic regenerator lifter can be applied. However, all of these are based upon the principles presented here. The basic features of one embodiment of the pneumatic lifter are presented in FIG. 18. This Figure depicts the use of a pneumatic lifter in a cool piston regenerated engine. It can be similarly applied to all other regenerated engines by application of the basic principles presented here. The engine depicted in FIG. 18 could be a two or a four stroke engine, such as the ones shown in FIGS. 1 and 3. It could operate with any of the cool piston operating sequences presented herein, such as FIGS. 4,6,7,13, and 15. Only the compression and expansion stroke are shown. Also, only components that are required to demonstrate the operating sequence of this embodiment of the pneumatic lifter are shown.

Like all the other regenerated engines, this engine has a piston (3) (sometimes referred to here as the large or primary piston) within a cylinder (1) that is closed at one end by a cylinder head (2). This piston contains a small internal cylinder (40) that is open to the crankcase on one end (41) and open to the interior of the cylinder on the other end (42). The diameter of this internal cylinder is exaggerated in FIG. 18 for clarity. Within this small internal cylinder is a small or secondary piston (43) which is attached to the regenerator drive rod (9) that passes into the small cylinder through the opening (42) in the piston face. A spring (44) is attached at one end to the small piston, and at the other end to the upper part of the small cylinder. This spring provides just enough upward force on the small piston to maintain the regenerator at the top of the cylinder when the large piston is at its BDC position. The small piston, the drive rod, and the regenerator (8) are moved by the combined forces of the spring and the pressure difference between the cylinder and the crankcase. Although it is anticipated that a number of springs and spring-like devices will be required or can be advantageously employed to control the motion of the regenerator, the following discussion of the pneumatic lifter concept assumes only a single spring. This is done for the purpose of clarity and brevity in this disclosure of the pneumatic lifter concept.

The spring (44) is attached to the upper surface of the internal cylinder (40) and to the upper surface of the small piston (43). At the start of the compression stroke (a) (in either a two or a four stroke engine) the large piston is at its bottom dead center position. At that time the spring is near its relaxed position, but with just enough tension to keep the regenerator at the top of the cylinder. During the compression process (a to b) the large piston rises causing the spring to be stretched and holding the regenerator firmly against the cylinder head. As the compression occurs, the cylinder pressure rises. As the large piston approaches its top dead center position, the pressure becomes great enough to overcome the spring tension and forces the internal piston down. Since the small piston is rigidly attached to the regenerator, the regenerator moves toward the primary piston (b to c). As the regenerator moves the working fluid is forced through it and heated, thereby further increasing the cylinder pressure. The small piston is thus forced to its lowest position within the primary piston and the regenerator is held against, or very close to, the large piston. As the regenerator is moving toward the piston, fuel is injected and the combustion heat released further increases the pressure. During approximately the first half of the expansion stroke (c to d), the pressure remains high enough to keep the regenerator adjacent to the large piston. At this point the tension forces in the spring exceed the reduced pressure force and the internal piston and the regenerator are forced upward. As the regenerator moves up (e), the thermal energy in the gas is transferred to the regenerator. This further reduces the cylinder pressure thus causing the regenerator to rise still higher until it reaches the top of the cylinder.

There are a variety of ways by which this pneumatic lifter can be used to move the regenerator. The use of a spring below the small piston and undergoing compression rather than tension also appears advantageous. In order to optimize the regenerator motion, and to prevent rapid accelerations and stopping of the regenerator, it may be desirable and/or necessary to have several springs of different sizes and designs acting on the internal piston or the regenerator drive rod. Hydraulic and pneumatic springs can also be used. The diameter of the internal cylinder and the small piston can also be used to control the size of the pressure force and hence, regenerator motion. Also, the opening between the large cylinder and the small cylinder can be designed to slowly "bleed" pressure into the small cylinder for slower regenerator response. Similarly the opening between the small cylinder and the crankcase can be used as an orifice to retard the downward motion of the small piston.

The volume of the small cylinder should be as small as possible so as not to significantly affect the compression ratio or serve as a heat sink for the working fluid. Since the movement of the regenerator only requires the overcoming of the aerodynamic forces (pressure drop through the regenerator) and the regenerator's inertia, and since these forces should be relatively small, a very small internal cylinder should be adequate. In fact, recognizing that the drive rod itself is acted upon by the cylinder pressure, it may be possible to use the regenerator drive rod itself as the small piston. This approach is preferred as it minimizes the gas volume in the small cylinder.

The pneumatic lifter concept can also be applied with the small cylinder and piston located in the cylinder head. The regenerator drive rod would then extend through the head and attach to the upper side of the regenerator.

Figure 20:
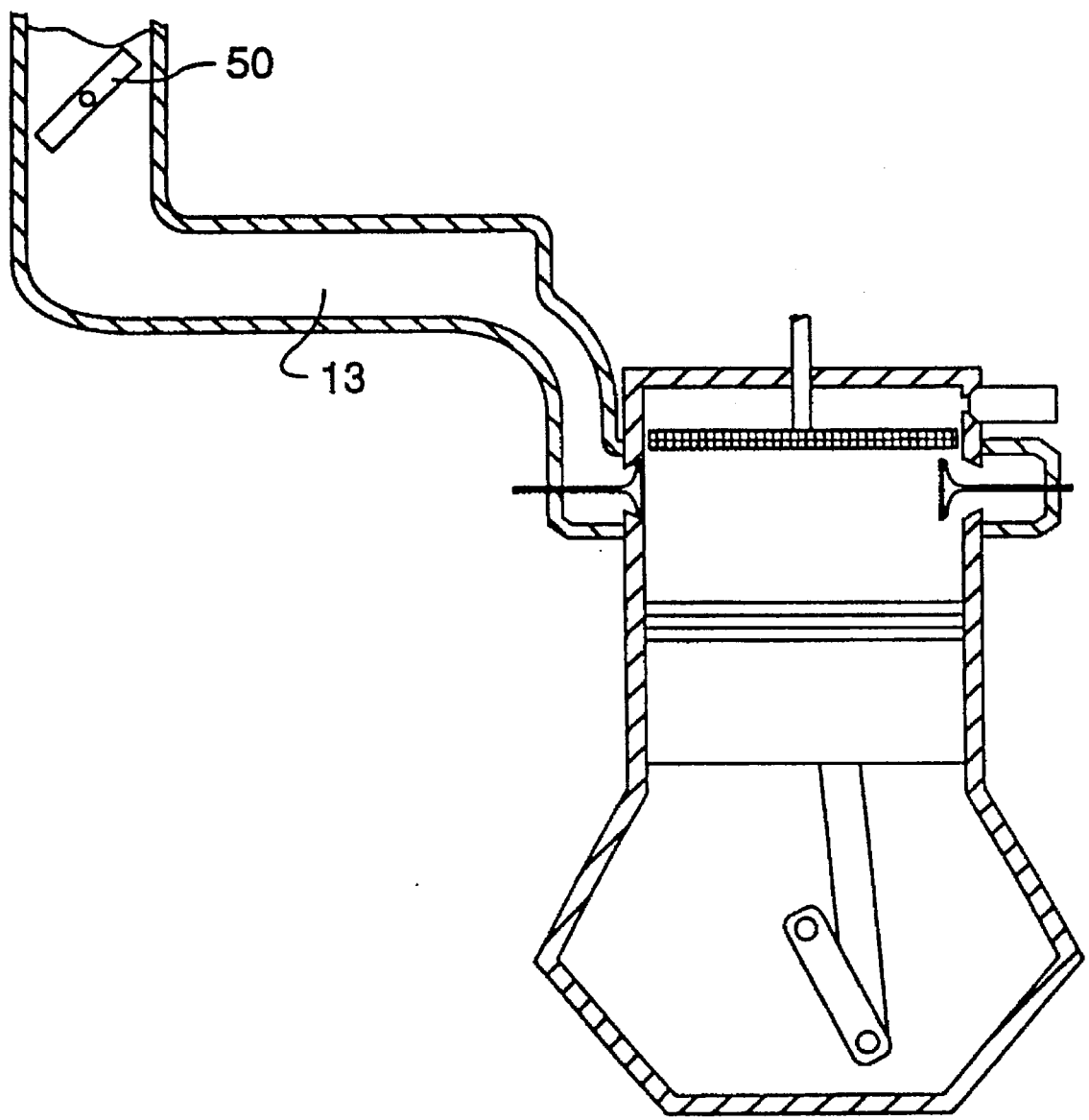
FIG. 20 shows a regenerated engine which employs a throttle as a means to reduce the amount of working fluid which enters the cylinder.

FIG. 20 presents another embodiment of the pneumatic lifter that demonstrates some of the features just discussed. In this case it is applied to a hot piston engine that has a regenerator drive rod passing through the cylinder head. This engine could be any of the hot piston designs previously presented, such as that of FIG. 2. It could operate on a two or a four stroke cycle. Only the main components of the engine are shown: the cylinder (1), the cylinder head (2), the piston (3), the regenerator (8) and the regenerator drive rod (9). The cylinder head has a hole through it (50) that accommodates the regenerator drive rod. This hole has sealing devices, such as common O-rings or metal piston rings to prevent leakage from the cylinder. The rod is acted upon by a spring (52) pressing against a small flange (51) attached to the drive rod. This spring is always compressed, that is, it exerts a downward force on the rod at all regenerator positions. Thus, the spring always strives to keep the regenerator adjacent to the piston and the pressure within the cylinder opposes the spring force.

During the final portion of the compression stroke and the first half of the expansion stroke, the pressure force within the cylinder becomes great enough to overcome the spring force. This forces the regenerator upward against the cylinder head. Note that with this version of the pneumatic regenerator lifter, the small internal piston has been replaced by the regenerator drive rod. If greater pressure force is needed, a small piston attached to the drive rod and moving in a small cylinder within the main cylinder head (2) can be added.

The use of the pneumatic lifter in a regenerated engine offers several important advantages. First, it makes the engine more compact, since no external mechanism for moving the regenerator is required. Second it uses the pressure forces directly rather than taking power from the crankshaft to move the regenerator. And perhaps most importantly, it provides a means to move and position the regenerator from either the cylinder head or the piston. This is useful because it will allow all seals and moving parts to be removed from the hot volume.

The pneumatic regenerator lifter can be applied in any type of regenerated engine that employs a movable regenerator. This would include both two and four stroke engines; hot and cool piston regenerated engines; engines that employ direct or indirect fuel injection or utilize a premixed fuel and air mixture (a carburetor or injection in the intake manifold); and supercharged, turbocharged, or naturally aspirated engines.

As the load on conventional diesel engines is decreased, the air to fuel ratio is increased and the peak temperatures decline. If this same approach is applied to regenerated engines operating at very low loads the temperatures will drop so low that engine efficiency will be reduced. In order to prevent the temperature from dropping too low, it may be advantageous to reduce engine power by decreasing the flow of air through the engine and maintaining lower air to fuel ratios, as is commonly done with gasoline engines. This can be done by reducing (i.e. throttling) the flow of working fluid into the cylinder by the use of a valve or other flow restriction device in the intake manifold.

Such a throttling device is shown in FIG. 20. This is the same engine as was presented in FIG. 1. More of the intake manifold (13) is shown. Within that intake manifold is a device (50) that partially blocks the flow of air to the cylinder when moved to some position and provides lessor blockage in other positions. This approach is applicable to any regenerated engine.

An alternative approach for reducing the flow of working fluid into the cylinder at lighter loads is to close the intake valve early during the intake stroke or to close it later in the compression stroke. This would require an engine with variable valve timing, a technology that is just now being put into practice.

As the load or speed of the regenerated engine changes, it is thermodynamically advantageous to change the regenerator's motion—that is, the timing of the regenerative heating and cooling strokes and their speed. This can be done using techniques currently in use or being developed that provide variable valve timing. One such method currently under development is often referred to as an "electronic cam". It uses electromechanical devices to provide the opening and closing motion of the valves. A larger version of this type of device could be beneficially applied to provide variable regenerator motion. Other devices currently being developed or used to provide variable valve timing could similarly be adapted to control the motion of the regenerator. Finally, other common mechanisms employing chains, gears, cams, levers, and other common components can be used to provide variable regenerator motion.

Because of the regenerative heating that occurs prior to fuel injection, the temperatures of the working fluid at the start of combustion in a regenerated engine are higher than they would be in any conventional engine operating at the same air to fuel ratio. As a result, the peak working fluid temperatures in the cylinder that occur during combustion are also much higher. These high temperatures require the use of high temperature, low conductivity materials and coatings on many internal surfaces in order to protect the metallic structure and components of the engine. These thermal barriers reduce the greater heat loss associated with the higher engine operating temperatures. These thermal barriers consist of ceramic coatings or monolithic plates or sheets or other structures made of materials that can withstand high temperatures and have low thermal conductivity. In addition, high temperature lubricants, piston rings and fuel injectors may be required. As a result of the use of these thermal barriers and other high temperature components, the regenerated engine may not require a water cooling system (radiator, water pump, et. al.). Depending upon the level of insulation provided, the regenerated engine may be sufficiently cooled by the surrounding air and by the oil. Thus, superior regenerated engines will employ these thermal barriers and will be Low Heat Rejection (LHR) regenerated engines. Much of this thermal barrier and LHR technology has been developed under programs in the Dept. of Energy and the Army.

All descriptions of the regenerated engine presented herein were descriptions of a single working unit of a regenerated engine. A single working unit consists of a single cylinder containing a piston. Most regenerated engines would be made up of a number of these individual working units. Generally, some or all of the intake and exhaust manifolds would be connected together and all of the pistons would be connected to a single crankshaft.

All regenerated engines must have means for the introduction of fresh working fluid and the expulsion of spent working fluid from the cold volume of the cylinder. These intake and exhaust means may consist of valves of any type, including: poppet valves (as shown in the Figures), rotary valves, slide valves, butterfly valves, ball valves, sleeve valves, or any other type of valve that can provide suitable flow and operating characteristics. These valves can be flush with the cylinder wall when closed, as is shown in FIG. 1, or they can be located some short distance from the cylinder and be connected to the cylinder via ports or passages. These intake and exhaust means can also be simple openings (often called ports) that are located in the cylinder wall and are opened and closed by being covered and uncovered by the piston, as is commonly done in small two stroke engines. However these intake and exhaust means are configured and placed, they must permit the flow of working fluid into and out of the cold volume. When any of these intake or exhaust means are "open", this indicates that they are so positioned or arranged that working fluid can pass through them between the cylinder and the appropriate manifold. It should be understood that although only single intake or exhaust means were presented in this disclosure, in every case, multiple means could be applied. For example, there could be two or more intake valves in FIG. 1.

Valves cannot be opened or closed instantaneously. Thus some time must be allotted for their opening and closing. Also, at higher engine speeds, the flows into or out of the cylinder will be slower, on a flow rate per crank angle basis, then they are at lower speeds. In conventional gasoline and diesel engines maximum volumetric efficiency is attained at higher speeds by opening valves early and closing them late. The valve timing is set for one engine speed (or sometimes two with variable valve timing) and operation at other speeds must be performed with less than optimum timing. This same approach is applicable to regenerated engines. Therefore, the valve opening and closing times presented herein should be viewed with an understanding that there may be considerable variation in them. When intake or exhaust means are referred to as being "substantially" open or closed this means that they are fully open or nearly fully open or they are nearly closed or closed, respectively. It is understood that there may be some time prior to, or after, this time that the intake or exhaust means will be completing the opening or closing.

Throughout this disclosure, the regenerator has been viewed as a thin, cylindrical disc. For an engine with a flat-faced piston and a flat cylinder head, this is the ideal shape, as it allows all of the internal volume of the cylinder to be swept by the regenerator. However, it is often advantageous to use pistons and heads that have surfaces that are not flat. For example, cylinder heads often have sloped surfaces to provide more room for valves. In order for the regenerator to fully sweep through the entire internal cylinder volume, the regenerator should be constructed so as to closely match the contours of the piston and the cylinder head. That is, the top of the regenerator should fit against the cylinder head with only minimal gaps and the bottom should fit against the piston face with only minimal gaps.

In all of the processes disclosed herein it must be understood that special operating conditions and other considerations may dictate minor changes in the timing of the events of these processes. Also, it is obvious that, based upon the teachings presented herein, many modifications and variations of this invention are possible. Therefore, it should be understood that, within the scope of the appended claims, the invention may be practiced otherwise than as specifically described herein.

It should be understood that "means to introduce fuel" includes all means by which fuel can enter the hot volume. This includes (1) direct injection into the hot volume, (2) injection into the cold volume and subsequent passage of the fuel through the regenerator, and (3) the introduction of the fuel into the working fluid prior to the working fluid's entry into the cylinder and the subsequent passage of the fuel through the regenerator and into the hot volume.

For some fuels with large ignition delays (e.g. lighter hydrocarbons such as propane and natural gas) and for some operating conditions (e.g. starting, idling, and lightly loaded), it may be necessary to provide an additional ignition source such as a spark plug or a glow plug.

Finally, all regenerated engines can have boosted intake pressures or be naturally aspirated. Also, all the regenerated engines presented herein employ a regenerator that does not have sealing devices to prevent leakage between the hot and cold volumes through the flow path between the regenerator and the cylinder wall. It is believed that no such sealing devices are required as long as a reasonably close fit between the regenerator and the cylinder wall is maintained. However, it may prove to be advantageous to provide some sealing means around the periphery of the regenerator. Such sealing means could be conventional piston rings, labyrinth seals or other common types.

Obviously, many modifications and variations of the present invention are possible in light of the above teachings. It is, therefore, to be understood that within the scope of appended claims, the invention may be practiced otherwise than as specifically described.

What is claimed and desired to be secured by Letters Patent of the United States is:

1. An internal combustion, reciprocating, regenerated engine having a number of similar working units, each working unit comprising:

a) a cylinder, closed at one end by a cylinder head and containing a movable piston which moves in a reciprocating manner and is connected to a power output shaft;

b) intake means for permitting the flow of fresh working fluid into said cylinder during a predetermined time during each operating cycle;

c) exhaust means to permit the flow of exhaust fluid from said cylinder during a second predetermined time during each operating cycle;

d) a thermal regenerator located within said cylinder and between said piston and said cylinder head, said regenerator being an alternating flow heat exchanger which can be moved between said piston and said cylinder head;

the movement of said regenerator including a regenerative heating stroke which begins during the last quarter of said piston's compression stroke and ends after expansion has begun and during the first quarter of said piston's expansion stroke, said regenerative heating stroke also being of sufficient speed and timing so as to maintain, to the greatest extent possible, a flow of working fluid out of said regenerator, through said regenerator's hot surface and into the hot volume, throughout said regenerative heating stroke;

e) means for moving said regenerator during additional predetermined times during the engine's operating cycle; and f) means for introducing fuel into said cylinder.

2. The internal combustion engine of claim 1 wherein the opening and closing of said intake means is so arranged and timed that the degree of compression which said working fluid experiences is less than the degree of expansion which said working fluid experiences.

3. The internal combustion engine of claim 2 wherein each working unit operates on a two stroke cycle, said intake means not allowing said working fluid to enter said cylinder until after the start of said piston's compression stroke, thereby providing an effective compression ratio that is less than the effective expansion ratio.

4. The internal combustion engine of claim 2 wherein each working unit operates on a four stroke cycle, and in which said intake means are substantially closed before said piston reaches its bottom dead center position at the end of its intake stroke.

5. The internal combustion engine of claim 2 wherein each working unit operates on a four stroke cycle, and in which said intake means remain open during a substantial portion of said piston's compression stroke, thereby allowing some of said working fluid introduced into said cylinder during the intake process to be forced back out of said cylinder through said intake means.

6. A process for operating the engine of claim 2 in a two stroke cycle, said engine having intake and exhaust means that communicate with the internal cylinder volume located between said piston and said regenerator, said process comprising the following steps:

a) opening said exhaust means when said piston is approaching its bottom dead center position, said intake means are closed, and said regenerator is adjacent to said cylinder head;

b) moving said piston toward said cylinder head;

c) opening said intake means, thereby allowing fresh, pressurized working fluid to enter said cylinder and to push out some of the remaining exhaust fluid through said exhaust means;

d) closing said exhaust means;

e) continuing the movement of said piston toward said cylinder head while working fluid continues to enter said cylinder;

f) closing said intake means;

g) continuing said piston's movement toward said cylinder head, thereby performing a compression stroke whereby the working fluid trapped within the cylinder is compressed;

h) moving said regenerator away from its position adjacent to said cylinder head and toward said piston as said piston approaches its top dead center position near the conclusion of said compression stroke;

i) introducing fuel into the space between said moving regenerator and said cylinder head while said piston completes its compression stroke and begins to move away from said cylinder head in its expansion stroke;

j) continuing the movement of said regenerator toward said piston while said piston continues its movement away from said cylinder head, said regenerator overtaking and being adjacent to said piston before the completion of the first quarter of said expansion stroke;

k) moving said regenerator and piston together at the same speed away from said cylinder head;

l) slowing the movement of said regenerator during the middle portion of said piston's expansion stroke, thereby increasing the distance between said regenerator and said piston, and beginning to move said regenerator toward said cylinder head; and m) continuing the movement of said piston toward its bottom dead center position while said regenerator moves to a position adjacent to said cylinder head.

7. A process for operating the engine of claim 2 in a two stroke cycle, said engine having intake and exhaust means that communicate with the internal cylinder volume located between said cylinder head and said regenerator, said process comprising the following steps:

a) opening said exhaust means when said piston is approaching its bottom dead center position, said intake means are closed, and said regenerator is adjacent to said piston;

b) moving said piston and regenerator together toward said cylinder head;

c) opening said intake means, thereby allowing fresh, pressurized working fluid to enter the cylinder and to push out some of the remaining exhaust fluid through said exhaust means;

d) closing said exhaust means;

e) continuing the movement of said piston and regenerator toward said cylinder head while working fluid continues to enter said cylinder;

f) closing said intake means;

g) continuing the movement of said piston and regenerator together and toward said cylinder head, thereby performing a compression stroke whereby said working fluid trapped in said cylinder is compressed;

h) moving said regenerator away from its position adjacent to said piston and toward said cylinder head as said piston approaches its top dead center position near the conclusion of said compression stroke;

i) injecting fuel into the space between said moving regenerator and said piston as said piston completes its compression stroke and begins to move away from said cylinder head in its expansion stroke;

j) moving said regenerator to a position adjacent to said cylinder head while said piston continues its expansion stroke, said regenerator movement being completed during the first quarter of said expansion stroke;

l) moving said regenerator from its position adjacent to said cylinder head and to a position adjacent to said piston, said movement beginning during the middle portion of said piston's expansion stroke and ending as said piston approaches its bottom dead center position.

8. A process for operating the engine of claim 2 in a four stroke cycle, said engine having intake and exhaust means that communicate with the internal cylinder volume located between said piston and said regenerator, said process comprising the following steps:

a) opening said exhaust means when said piston is near its bottom dead center position, said intake means are closed, and said regenerator is adjacent to said cylinder head;

b) moving said piston to its top dead center position near to said cylinder head, thereby performing an exhaust stroke whereby spent working fluid is expelled from said cylinder;

c) opening said intake means as said piston approaches the end of said exhaust stroke;

d) moving said piston from its top dead center position to its bottom dead center position, thereby performing an intake stroke and drawing fresh working fluid into said cylinder;

e) closing said exhaust means during the early part of said intake stroke;

f) closing said intake means during said intake stroke;

g) moving said piston toward said cylinder head, thereby performing a compression stroke whereby said working fluid that is trapped within said cylinder is compressed;

h) moving said regenerator away from its position adjacent to said cylinder head and toward said piston as said piston approaches its top dead center position near the conclusion of said piston's expansion stroke;

i) introducing fuel into the space between said moving regenerator and said cylinder head while said piston completes said compression stroke and begins to move away from said cylinder head in its expansion stroke;

j) continuing the movement of said regenerator toward said piston while said piston continues its movement away from said cylinder head, said regenerator overtaking and being close to said piston before the completion of the first quarter of said expansion stroke;

k) moving said regenerator and piston at the same speed away from said cylinder head;

l) slowing the movement of said regenerator during the middle portion of said piston's expansion stroke, thereby increasing the distance between said regenerator and said piston, and beginning to move said regenerator toward said cylinder head; and m) continuing the movement of said piston toward its bottom dead center position while said regenerator moves to a position adjacent to said cylinder head.

9. A process for operating the engine of claim 2 in a four stroke cycle, said engine having intake and exhaust means that communicate with the internal cylinder volume located between said piston and said regenerator, said process comprising the following steps:

a) opening said exhaust means when said piston is near its bottom dead center position, said intake means are closed, and said regenerator is adjacent to said cylinder head;

b) moving said piston to its top dead center position near to said cylinder head, thereby performing an exhaust stroke whereby spent working fluid is expelled from said cylinder;

c) opening said intake means as said piston approaches the end of its exhaust stroke;

d) moving said piston from its top dead center position to its bottom dead center position, thereby performing an intake stroke and drawing fresh working fluid into said cylinder;

e) closing said exhaust means during the early part of said intake stroke;

f) moving said piston toward said cylinder head while maintaining said intake means open until a portion of said working fluid is expelled through said intake means and out of said cylinder;

g) closing said intake means;

h) moving said piston to its top dead center position close to said cylinder head, thereby performing a compression stroke whereby said working fluid remaining within said cylinder is compressed;

i) moving said regenerator away from its position adjacent to said cylinder head and toward said piston as said piston approaches its top dead center position near the completion of said compression stroke;

j) introducing fuel into the space between said moving regenerator and said cylinder head while said piston completes its compression stroke and begins to move away from said cylinder head in its expansion stroke;

k) continuing the movement of said regenerator toward said piston while said piston continues its movement away from said cylinder head, said regenerator overtaking and being close to said piston before the completion of the first quarter of said expansion stroke;

l) moving said regenerator and piston at the same speed away from said cylinder head;

m) slowing the movement of said regenerator during the middle portion of said piston's expansion stroke, thereby increasing the distance between said regenerator and said piston, and beginning to move said regenerator toward said cylinder head; and n) continuing the movement of said piston toward its bottom dead center position while said regenerator moves to a position adjacent to said cylinder head.

10. A process for operating the engine of claim 2 in a four stroke cycle, said engine having intake and exhaust means that communicate with the internal cylinder volume located between said cylinder head and said regenerator, said process comprising the following steps:

a) opening said exhaust means when said piston is near its bottom dead center position, said intake means are closed, and said regenerator is adjacent to said piston;

b) moving said piston and regenerator together toward said cylinder head, thereby performing an exhaust stroke whereby spent working fluid is expelled from the cylinder;

c) opening said intake means as said piston and regenerator approach the end of said exhaust stroke;

d) moving said piston from its top dead center position to its bottom dead center position, keeping said regenerator close to said piston, and thereby performing an intake stroke whereby fresh working fluid is introduced into said cylinder;

e) closing said exhaust means during the early part of said intake stroke;

f) closing said intake means during said intake stroke;

g) moving said piston and regenerator together and toward said cylinder head, thereby performing a compression stroke whereby the air trapped in the cylinder is compressed;

h) moving said regenerator away from its position adjacent to said piston and toward said cylinder head as said piston approaches its top dead center position near the conclusion of said compression stroke;

i) injecting fuel into the space between said moving regenerator and said piston as said piston completes its compression stroke and begins to move away from said cylinder head in said piston's expansion stroke;

j) moving said regenerator to a position adjacent to said cylinder head while said piston continues its expansion stroke, said regenerator movement being completed during the first quarter of said expansion stroke; and k) moving said regenerator from its position adjacent to said cylinder head and to a position adjacent to said piston, said movement beginning during the middle portion of said piston's expansion stroke and ending as said piston approaches its bottom dead center position.

11. A process for operating the engine of claim 2 in a four stroke cycle, said engine having intake and exhaust means that communicate with the internal cylinder volume located between said cylinder head and said regenerator; said process comprising the following steps:
   a) opening said exhaust means when said piston is near its bottom dead center position, said intake means are closed, and said regenerator is adjacent to said piston;
   b) moving said piston and regenerator together toward said cylinder head, thereby performing an exhaust stroke whereby spent working fluid is expelled from said cylinder;
   c) opening said intake means as said piston and regenerator approach the end of said exhaust stroke;
   d) moving said piston from its top dead center position to its bottom dead center position, keeping said regenerator close to said piston, and thereby performing an intake stroke whereby fresh working fluid is introduced into said cylinder;
   e) closing said exhaust means during the early part of said intake stroke;
   f) moving said piston and regenerator together and toward said cylinder head while maintaining said intake means open until a portion of said working fluid is expelled through said intake means and out of said cylinder;
   g) closing said intake means;
   h) moving said piston and regenerator together toward said cylinder head, thereby performing a compression stroke whereby the working fluid trapped in said cylinder is compressed;
   i) moving said regenerator away from its position adjacent to said piston and toward said cylinder head as said piston approaches its top dead center position near the conclusion of said compression stroke;
   j) injecting fuel into the space between said moving regenerator and said piston as said piston completes its compression stroke and begins to move away from said cylinder head in said piston's expansion stroke;
   k) moving said regenerator to a position adjacent to said cylinder head while said piston continues its expansion stroke, said regenerator movement being completed during the first quarter of said expansion stroke; and
   l) moving said regenerator from its position adjacent to said cylinder head and to a position adjacent to said piston, said movement beginning during the middle portion of said piston's expansion stroke and ending as said piston approaches its bottom dead center position.

12. The internal combustion engine of claim 1 in which said fuel is introduced into the hot volume, where combustion occurs, by passing through the hot surface of said regenerator.

13. The internal combustion engine of claim 1 in which said fuel introduction means are placed so as to provide direct introduction of fuel into the space within said cylinder on the cold side of said regenerator.

14. The internal combustion engine of claim 1 in which said intake and exhaust means communicate with the cylinder volume located between said piston and said regenerator, and in which said fuel is introduced into the working fluid entering said cylinder prior to the entry of said working fluid into said cylinder, said fuel being transported into said cylinder by and with said working fluid.

15. The internal combustion engine of claim 1 in which said intake and exhaust means communicate with the cylinder volume located between said regenerator and said cylinder head, and in which said regenerator movement includes a regenerative cooling stroke, whereby said regenerator is moved from a position close to said cylinder head to a position close to said piston during said piston's expansion stroke, and in which said fuel is introduced into the working fluid entering said cylinder prior to the entry of said working fluid into said cylinder, said fuel being transported into said cylinder by and with said working fluid.

16. The internal combustion engine of claim 1 in which at least a portion of said fresh working fluid that enters said cylinder during each operating cycle, enters through passages in said means for moving said regenerator.

17. The internal combustion engine of claim 1 in which at least a portion of said spent working fluid that leaves said cylinder during each operating cycle, leaves through passages in said means for moving said regenerator.

18. The internal combustion engine of claim 1 in which means are provided for reducing the amount of the working fluid that enters the cylinder during each operating cycle, thereby reducing engine power while maintaining high efficiency.

19. The internal combustion engine of claim 1 in which said intake means comprise one or more valves that open and close one or more passages in the cylinder wall, said valves being substantially flush mounted in said cylinder wall when closed.

20. The internal combustion engine of claim 1 in which said exhaust means comprise one or more valves that open and close one or more passages in the cylinder wall, said valves being substantially flush mounted in said cylinder wall when closed.

21. The internal combustion engine of claim 1 in which the entire internal volume of said cylinder is so arranged as to allow the regenerator to pass through all of said internal cylinder volume, with the exception of small clearance regions.

22. A process for operating the internal combustion engine of claim 1 in a two stroke cycle, said engine having intake and exhaust means that communicate with the internal cylinder volume located between said piston and said regenerator, said process comprising the following steps:
   a) opening said exhaust means when said piston is approaching its bottom dead center position, said intake means are closed, and said regenerator is adjacent to said cylinder head;
   b) opening said intake means;
   c) moving said piston to its bottom dead center position and initiating movement of said piston toward said cylinder head;
   d) closing said exhaust means;
   e) closing said intake means;
   f) continuing to move said piston toward said cylinder head, thereby performing a compression stroke whereby the working fluid trapped within said cylinder is compressed;
   g) moving said regenerator away from its position adjacent to said cylinder head and toward said piston as said piston completes said compression stroke and begins to move away from said cylinder head in said piston's expansion stroke,
   this separate movement of said regenerator beginning during the last quarter of said piston's compression stroke and ending during the first quarter of said piston's subsequent expansion stroke when said regenerator reaches said piston, said regenerator's movement also being of sufficient speed and timing as to maintain, to the greatest extent possible, a flow of working fluid out of said regenerator, through said regenerator hot surface and into the hot volume, throughout said regenerator's movement;

h) introducing fuel into the space between said moving regenerator and said cylinder head while said piston completes its compression stroke and begins to move away from said cylinder head in its expansion stroke;

i) moving said regenerator and piston together, at the same speed, away from said cylinder head;

j) slowing the movement of said regenerator during the middle portion of said piston's expansion stroke, thereby increasing the distance between said regenerator and said piston, and beginning to move said regenerator toward said cylinder head; and k) continuing the movement of said piston toward its bottom dead center position while said regenerator moves to a position adjacent to said cylinder head.

23. A process for operating the internal combustion engine of claim 1 in a two stroke cycle, said engine having intake and exhaust means that communicate with the internal cylinder volume located between said regenerator and said cylinder head, said process comprising the following steps:

a) opening said exhaust means when said piston is approaching its bottom dead center position, said intake means are closed, and said regenerator is adjacent to said piston;

b) opening said intake means;

c) moving said piston to its bottom dead center position and initiating movement of said piston toward said cylinder head, while maintaining said regenerator adjacent to said piston;

d) closing said intake means;

e) closing said exhaust means;

f) continuing the movement of said piston and regenerator together and toward said cylinder head, thereby performing a compression stroke whereby the air trapped in the cylinder is compressed;

g) moving said regenerator away from its position adjacent to said piston and toward said cylinder head as said piston completes said compression stroke and begins to move away from said cylinder head in said piston's expansion stroke, this separate movement of said regenerator beginning during the last quarter of said piston's compression stroke and ending during the first quarter of said piston's subsequent expansion stroke when said regenerator reaches said cylinder head, said regenerator movement also being of sufficient speed and timing as to maintain, to the greatest extent possible, a flow of working fluid out of said regenerator, through said regenerator's hot surface and into the hot volume, throughout said regenerator's movement;

h) injecting fuel into the space between said moving regenerator and said piston as said piston completes its compression stroke and begins to move away from said cylinder head in said piston's expansion stroke; and i) moving said regenerator from its position adjacent to said cylinder head and to a position adjacent to said piston, said movement beginning during the middle portion of said piston's expansion stroke and ending as said piston approaches its bottom dead center position near the conclusion of said piston's expansion stroke.

24. The internal combustion engine of claim 1 in which said regenerator contains catalytic materials on some portion of said regenerator's surfaces that are exposed to said working fluid, said catalytic materials serving to increase the reactivity of the working fluid passing through it.

25. The internal combustion engine of claim 1 in which said regenerator contains catalytic materials on said regenerator's surfaces that promote chemical reactions that reduce pollutants in the spent working fluid passing through said regenerator.

26. The internal combustion engine of claim 1 in which said regenerator contains catalytic materials on some portion of said regenerator's surfaces that are exposed to said working fluid, said catalytic materials increasing the reactivity of chemical reactions that utilize soot and hydrocarbons trapped in the regenerator to destroy oxides of nitrogen.

27. The internal combustion engine of claim 1 in which said regenerator has internal flow passages that are of different average size in different portions of said regenerator.

28. The internal combustion engine of claim 1 in which at least one secondary piston is connected to said regenerator, said secondary piston being acted upon by the pressure in said cylinder so as to provide at least a portion of the force required to place said regenerator at predetermined positions within said cylinder at predetermined times during the operating cycle.

29. The internal combustion engine of claim 1 in which said means for moving said regenerator are adjustable so as to provide variations in the cycle to cycle movement of said regenerator.

* * * * *